(12) United States Patent
Kaneko et al.

(10) Patent No.: US 6,637,875 B2
(45) Date of Patent: Oct. 28, 2003

(54) AQUEOUS RECORDING LIQUID, RECORDING METHOD AND APPARATUS USING SAME

(75) Inventors: Tetsuya Kaneko, Yokohama (JP); Hitoshi Arita, Yokohama (JP); Kiyofumi Nagai, Machida (JP); Kakuji Murakami, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/103,729

(22) Filed: Mar. 25, 2002

(65) Prior Publication Data
US 2003/0038869 A1 Feb. 27, 2003

(30) Foreign Application Priority Data
Mar. 23, 2001 (JP) ........................................ 2001-085890

(51) Int. Cl.[7] .................................................. B41J 2/01
(52) U.S. Cl. ......................... 347/100; 347/96; 347/101; 106/31.6
(58) Field of Search .................. 347/100, 96, 101, 347/105; 106/31.6, 31.13; 428/195

(56) References Cited

U.S. PATENT DOCUMENTS

| 4,508,570 | A | 4/1985 | Fujii et al. ................... 347/100 |
| 5,619,765 | A | 4/1997 | Tokita et al. |
| 5,622,550 | A | 4/1997 | Konishi et al. |
| 5,782,254 | A | 7/1998 | Tanikawa et al. |
| 5,810,915 | A | 9/1998 | Nagai et al. |
| 5,851,717 | A | 12/1998 | Tsubuko et al. |
| 5,879,439 | A | 3/1999 | Nagai et al. |
| 5,882,390 | A | 3/1999 | Nagai et al. |
| 5,968,301 | A | 10/1999 | Murakami et al. |
| 5,972,082 | A | 10/1999 | Koyano et al. |
| 5,992,117 | A | 11/1999 | Schmidt |
| 5,993,524 | A | 11/1999 | Nagai et al. |
| 6,020,103 | A | 2/2000 | Tsubuko et al. |
| 6,120,589 | A | 9/2000 | Bannai et al. |
| 6,231,652 | B1 | 5/2001 | Koyano et al. |
| 6,261,349 | B1 | 7/2001 | Nagai et al. |
| 6,361,852 | B1 | 3/2002 | Gu et al. ..................... 428/195 |
| 6,439,713 | B1 | 8/2002 | Noguchi et al. |
| 6,471,757 | B1 | 10/2002 | Koitabashi et al. ...... 106/31.28 |

FOREIGN PATENT DOCUMENTS

| EP | 0812888 A2 | 6/1996 | ........... C09D/11/00 |
| EP | 0 812 888 | 12/1997 | |
| JP | 10-036733 | 2/1998 | ........... C09D/11/00 |

OTHER PUBLICATIONS

Derwent Publications, AN 1998–175178, XP–002199227, JP 10 036733, Feb. 10, 1998.
Derwent Publications, AN 1997–017646, XP–002199228, JP 08 283640, Oct. 29, 1996.

*Primary Examiner*—Judy Nguyen
*Assistant Examiner*—Manish Shah
(74) *Attorney, Agent, or Firm*—Oblon, Spivak, McClelland, Maier & Neustadt, P.C.

(57) ABSTRACT

An aqueous recording liquid suitable for use in ink jet printing containing a colorant, 2,2,4-trimethyl-1,3-pentanediol, and at least one surfactant selected from polyoxyethylene alkyl ethers and polyoxyethylene alkyl ether acetates.

24 Claims, 3 Drawing Sheets

AQUEOUS RECORDING LIQUID, RECORDING METHOD AND APPARATUS USING SAME

BACKGROUND OF THE INVENTION

The present invention relates to an aqueous recording liquid suitable either for an on-demand ink jet recording system, such as a piezoelectric system or a thermal system, or for a continuous injection type ink jet recording system such as a charge control system, and more particularly, to an aqueous recording liquid composition which exhibits excellent properties when used for printing on a plain paper and which can be also used as an aqueous recording liquid for a writing utensil, a recorder or a pen plotter.

In recent years, an ink jet recording system has been rapidly spreading because of its advantages such as compactness, low price, low running cost and low noise. An ink jet printer capable of printing on a non-coated plain paper such as a transfer paper for electrophotography, a printing paper, a typewriter paper, a wire dot printer paper, a word processor paper, a letter paper, a reporting paper is also placed on the market.

There have been proposed inks for use in such an ink jet printer having improved drying property to obtain an image of higher quality.

However, it is difficult to obtain an ink satisfying all the requirements; color reproducibility, water resistance, photoresistance, drying property, anti-blurring property and ejection reliability.

In the case of a color printer, even when no deterioration of image quality is observed in image areas printed in a single color of yellow, magenta or cyan, deterioration of image quality tends to occur in image areas of colors obtained by superimposing two color inks such as red, green and blue. In the case of a printer in which an image is dried without using a fixing unit, when the drying property of an ink is improved by enhancing the penetrability thereof as described in JP-A-S55-29546, the ink has a significant tendency to blur.

JP-B-S60-23793 suggests that, when dialkyl sulfosuccinate is used as a surfactant of an ink, the drying property of the ink can be improved without deteriorating image quality. However, the pixel diameter of a printed image remarkably varies depending upon the kind of a paper, and the density of the printed images is considerably decreased.

JP-A-S58-6752 discloses a quick drying ink whose anti-blur property is improved by enhancing the penetrability thereof using a surfactant containing an ethylene oxide having an acetylenic linkage.

However, some colorants cause the following problems. When an ink containing a direct dye such as DBK 168 is used, the drying rate of the ink cannot be improved due to a hydrophobic interaction between the surfactant and the colorant. When an ink containing a pigment such as carbon black is used, the pigment tends to aggregate, causing clogging of nozzles or inclination of ink ejection direction.

For the purpose of improving drying rate, JP-A-H8-113739 discloses an ink containing a dye and water-soluble glycol ethers and JP-A-H10-95941 proposes an ink composition composed of a pigment, glycol ethers such as diethyleneglycol mono-n-butyl ether and water.

However, a large amount of glycol ethers must be added to improve the drying rate of the ink, which is not preferable from the viewpoint of odor and safety.

JP-A-S56-57862 discloses an ink containing a strong basic substance. With this ink, an image with no deterioration can be formed on an acidic paper sized with rosin. However, this ink is not suitable for a paper prepared using alkyl ketene diner or alkenyl sulfosuccinic acid as a sizing agent. Even on an acidic paper, image deterioration is observed in image areas of colors obtained by superimposing two colors.

JP-A-138374 discloses an aqueous recording ink comprising a water-soluble dye, water and a benzyl ether having a specific structure. It is also suggested therein adding to the ink a vegetable oil, an unsaturated fatty acid, a higher alcohol, a fatty acid ester, an oily substance such as a mineral oil, and a hardly or slightly water-soluble solvent having a hydroxyl group in the molecular such as 2-ethyl-1,6-hexanediol, diethylene glycol hexyl ether, ethylene oxide adduct of acetylene glycol (having addition mole number of not greater than 5) and ethylene glycol benzyl ether for the purpose of further improving the penetrability of the ink. However, these inks have a problem in safety. Moreover, these inks have a significant problem in stability. The oily substance, the hardly or slightly water-soluble solvent benzyl ether and so on are separated at a certain environmental temperature.

Japanese Patent No. 2894568 proposes an ink jet ink comprising a composition containing a colorant and a liquid medium containing at least 60% by weight of water and 0.2 to 30% by weight of an alkylene glycol having 7 to 10 carbon atoms. Compounds shown as preferred examples of the alkylene glycol having 7 to 10 carbon atoms are 1,7-heptanediol, 2,6-heptanediol, 2,4-dimethyl-2,4-pentanediol, 3-ethyl-1,3-pentanediol and so on. It is said that, by addition of the compounds, there can be provided an ink which has "improved anti-blurring property, drying property and penetrability for a plain paper", which has "good balance between blurring property and penetrability" and which is "highly reliable in preventing clogging of ejection nozzle". In reality, however, the penetrability of the ink cannot sufficiently improved by addition of the above compounds and thus the drying property of the ink is still poor. Also, the ink is apt to blur on some types of papers. Namely, none of the problems of prior arts is not overcome.

Japanese Patent No. 2714482 proposes an ink jet ink containing an aliphatic diol compound having at least 6 carbon atoms and having a water solubility of at least 4.5% by weight at 25° C. The diol compounds shown as the examples include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and so on. However, any inks containing the above compound cannot have sufficient penetrability and causes color bleeding or feathering.

JP-A-H6-157959 proposes an aqueous ink to which 2-ethyl-1,3-hexanediol is added for the purpose of improving permeability, and a recording method using the same.

2-Ethyl-1,3-hexanediol is not included in the examples of the usable compounds shown in Japanese Patent No. 2894568 but has been found to be able to be provide an aqueous ink composition which can satisfy the properties required of an ink jet ink, which is excellent in penetrability and drying property, and which can overcome the problem of image deterioration, and which can provide a recording method for producing a high-quality image using the ink composition. Since 2-ethyl-1,3-hexanediol can impart high ejection stability on high-frequency driving to an ink with a small amount, the method of recording using the ink is high in safety.

However, with the rapid progress of technologies in recent years, the printing speed of an ink jet printer has been greatly increased and it is not unthinkable that it will be much faster in the future. Under such circumstances, the ink is required to cause no color bleeding in printing at a higher speed and to dry quickly without transferring to a finger even if rubbed therewith immediately after printing.

In general, a quick drying ink has high penetrability. At the same time, a colorant in the ink is penetrated into a paper in the thickness direction thereof so largely that the image density tends to be decreased and strike-through is likely to occur. It is apparent that double-side printing will be essential with the progress of an ink jet printer and for the purpose of reducing paper consumption as an environmental issue. Thus, an aqueous ink having high drying property and causing so little strike-through as to permit double-side printing is demanded.

As has been described above, an aqueous ink jet ink which satisfies various requirements as an ink jet ink, which has high penetrability and drying property irrespective of the type of a colorant or the type of a paper, and which is capable of producing a high quality image with little strike-through is still required to be developed.

In recent years, a system for reading out recorded information printed with an ink which is invisible under ordinary circumstances with infrared rays or ultraviolet rays has been put to practical use in the fields of bar code printing and post mark printing. In view of preventing environmental pollution, application of an aqueous type recording liquid to such a system is under consideration. Additionally, in order to cope with such a system where high-speed processing is essential, an aqueous recording liquid having high penetrability is demanded.

SUMMARY OF THE INVENTION

The present invention has been made in view of the above problems and it is, therefore, an object of the present invention to provide a recording liquid which can overcome the drawbacks of the prior arts.

Another object of the present invention is to provide an ink jet recording method and an ink jet recording apparatus using the recording liquid.

In accomplishing the above objects, the present invention provides an aqueous recording liquid comprising a colorant, 2,2,4-trimethyl-1,3-pentanediol, and at least one surfactant selected from the group consisting of polyoxyethylene alkyl ethers and polyoxyethylene alkyl ether acetates.

In another aspect, the present invention provides a recording method for forming an image on a recording medium, comprising ejecting the above aqueous recording liquid as droplets onto said recording medium from a minute ejection nozzle.

The present invention further provides a recording liquid cartridge having a recording liquid container containing the above aqueous recording liquid.

The present invention further provides an ink jet recording device comprising the above recording liquid cartridge.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
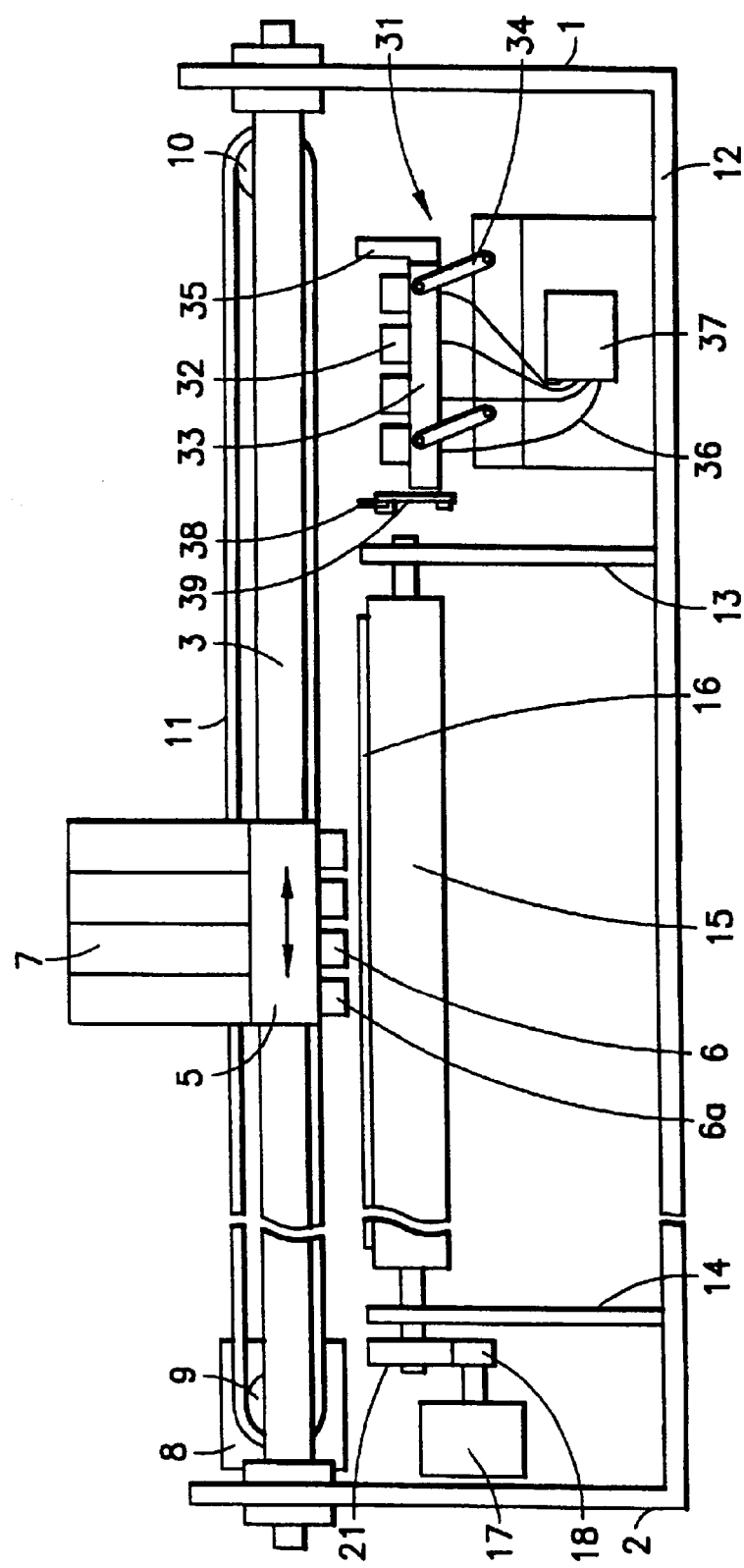
FIG. 1 is a schematic front view illustrating an embodiment of an ink jet recording apparatus mounting an ink cartridge containing an aqueous recording liquid to which the present invention is applied.

The aqueous recording liquid according to the present invention comprises at least a colorant, 2,2,4-trimethyl-1,3-pentanediol, and a polyoxyethylene alkyl ether surfactant and/or a polyoxyethylene alkyl ether acetate surfactant.

The polyoxyethylene alkyl ether is preferably an ether represented by the general formula (1):

$$R_1O(CH_2CH_2O)pH \qquad (1)$$

wherein $R_1$ represents a straight or branched alkyl group having 8 to 14 carbon atoms and p represents an integer of 1 to 30.

The polyoxyethylene alkyl ether acetate surfactant is preferably an acetate represented by the general formula (2):

$$R_2O(CH_2CH_2O)_qCH_2COOM \qquad (2)$$

wherein $R_2$ represents a straight or branched alkyl group having 8 to 14 carbon atoms, q represents an integer of 3 to 8, and M represents an alkali metal ion, a quaternary ammonium, a quaternary phosphonium or an alkanolamine.

The aqueous recording liquid according to the present invention has excellent storage stability, and exhibits high wettability on a paper surface and a high rate of penetration into a paper irrespective of the type of the paper. Additionally, the aqueous recording liquid is much less liable to cause image deterioration as compared with a conventionally known recording liquid whose penetrability is enhanced. When used in an ink jet recording system, the aqueous recording liquid exhibits high ejection properties without causing clogging of nozzles. Moreover, the aqueous recording liquid can exhibit such excellent properties in combination with various colorants.

Examples of compounds represented by the formula (1) include compounds represented by the following formulas (1-1) to (1-13) but the present invention is not limited thereto.

| | |
|---|---|
| $C_8H_{17}O(C_2H_4O)_2H$ | (1-1) |
| $C_{10}H_{21}O(C_2H_4O)_4H$ | (1-2) |
| $C_{12}H_{25}O(C_2H_4O)_3H$ | (1-3) |
| $C_{12}H_{25}O(C_2H_4O)_7H$ | (1-4) |
| $C_{12}H_{25}O(C_2H_4O)_{12}H$ | (1-5) |
| $C_{13}H_{27}O(C_2H_4O)_3H$ | (1-6) |
| $C_{13}H_{27}O(C_2H_4O)_5H$ | (1-7) |
| $C_{13}H_{27}O(C_2H_4O)_7H$ | (1-8) |
| $C_{13}H_{27}O(C_2H_4O)_9H$ | (1-9) |
| $C_{13}H_{27}O(C_2H_4O)_{12}H$ | (1-10) |
| $C_{13}H_{27}O(C_2H_4O)_{20}H$ | (1-11) |
| $C_{13}H_{27}O(C_2H_4O)_{30}H$ | (1-12) |
| $C_{14}H_{29}O(C_2H_4O)_{30}H$ | (1-13) |

These compounds may be used alone or in combination. A compound which is not easily dissolved in the recording liquid when used alone is solubilized when mixed with other compound and can be stably present therein.

Examples of commercially available surfactants containing such a compound as the main component include BT series available from Nikko Chemicals Co., Ltd., Softanol series available from Nippon Shokubai Co., Ltd., and Dispanol available from Nippon Oils & Fats Co., Ltd. These are preferably employed for the purpose of the present invention.

Examples of compounds represented by the general formula (2) include compounds represented by the formulas (2-1) to (2-13) in which M is as defined above, but the present invention is not limited thereto.

| | |
|---|---|
| $C_8H_{17}O(C_2H_4O)_3CH_2COOM$ | (2-1) |
| $C_{10}H_{21}O(C_2H_4O)_4CH_2COOM$ | (2-2) |
| $C_{12}H_{25}O(C_2H_4O)_3CH_2COOM$ | (2-3) |
| $C_{12}H_{25}O(C_2H_4O)_4CH_2COOM$ | (2-4) |
| $C_{12}H_{25}O(C_2H_4O)_5CH_2COOM$ | (2-5) |
| $C_{12}H_{25}O(C_2H_4O)_{12}CH_2COOM$ | (2-6) |
| $C_{13}H_{27}O(C_2H_4O)_3CH_2COOM$ | (2-7) |
| $C_{13}H_{27}O(C_2H_4O)_5CH_2COOM$ | (2-8) |
| $C_{13}H_{27}O(C_2H_4O)_7CH_2COOM$ | (2-9) |
| $C_{13}H_{27}O(C_2H_4O)_9CH_2COOM$ | (2-10) |
| $C_{13}H_{27}O(C_2H_4O)_{12}CH_2COOM$ | (2-11) |
| $C_{14}H_{29}O(C_2H_4O)_3CH_2COOM$ | (2-12) |
| $C_{14}H_{29}O(C_2H_4O)_{12}CH_2COOM$ | (2-13) |

These compounds may be used alone or in combination. A compound which is not easily dissolved in the recording liquid when used alone is solubilized when mixed with other compound and can be stably present therein. It is preferred that inorganic salts produced as byproducts at the time of synthesis of the compound be removed with an ion-exchange resin.

Examples of commercially available surfactants containing such a compound as the main component include NIKKOLECT series and NIKKOLAKYPO series available from Nippon Chemicals Co., Ltd. Other surfactants such as Beaulight series available from Sanyo Chemical Industries, Ltd. can be also employed.

The polyoxyethylene alkyl ether acetate surfactant is used in the form of a salt with M. As the counter ion M, an alkali metal ion, quaternary ammonium, quaternary phosphonium, or alkanolamine is preferably employed. Also, when a sodium cation, a lithium cation, and/or a cation of quaternary ammonium, quaternary phosphonium or alkanolamine reperesented by the general formula (4) is used as the counter ion M, the dissolution stability is further enhanced.

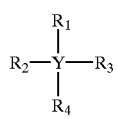

(4)

wherein Y represents a nitrogen atom or a phosphorus atom, $R_1$ to $R_4$ each represent a hydrogen atom, an alkyl group, a hydroxyalkyl group, and an alkyl group halide, respectively. The "alkyl" is preferably a lower alkyl preferably having 1 to 4 carbon atoms.

The polyoxyethylene alkyl ether acetate surfactant in the form of a salt may be prepared by, for example, adding a hydroxide to the corresponding acid. For example, a surfactant in the form of a lithium salt may be prepared by adding lithium hydroxide to polyoxyethylene alkyl ether acetatic acid. When the surfactant is a salt with quaternary ammonium, quaternary phosphonium or alkanolamine represented by the general formula (4), the surfactant is prepared by adding one of the following hydroxides to polyoxyethylene alkyl ether acetatic acid.

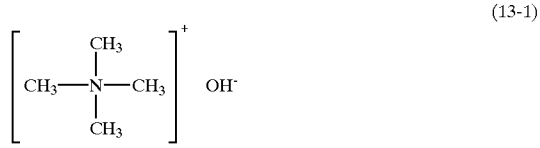
(13-1)

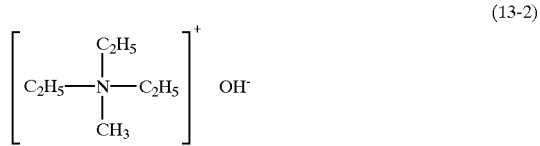
(13-2)

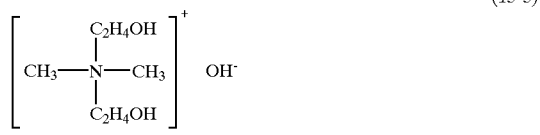
(13-3)

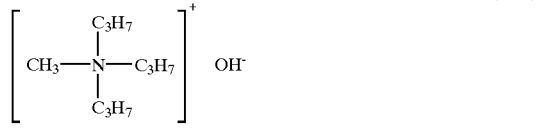
(13-4)

(13-5)

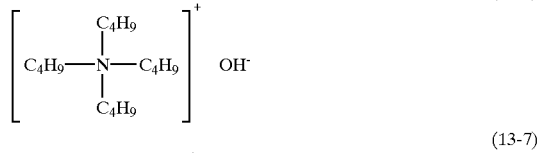
(13-6)

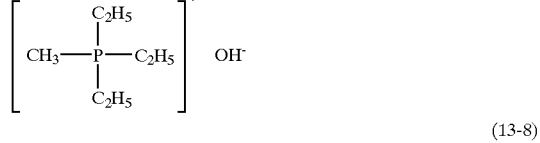
(13-7)

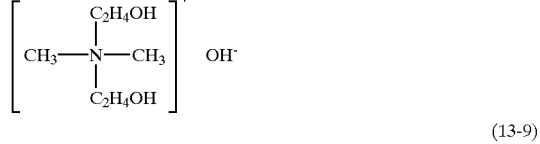
(13-8)

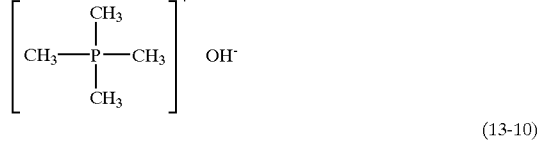
(13-9)

$(C_2H_4OH)_3NH^+$   $OH^-$ (13-10)

The polyoxyethylene alkyl ether surfactant and polyoxyethylene alkyl ether acetate surfactant may be used alone or in combination.

According to the present invention, there can be obtained a recording liquid which has significantly high penetrability, which is stable without having separation therein and which has high safety by using 2,2,4-trimethyl-1,3-pentanediol together with the polyoxyethylene alkyl ether surfactant and/or polyoxyethylene alkyl ether acetate surfactant.

While not wishing to be bound by the theory, the mechanism by which the above functions are attained by the use of the polyoxyethylene alkyl ether surfactant and/or the polyoxyethylene alkyl ether acetate surfactant in conjunction with 2,2,4-trimethyl-1,3-pentanediol is assumed to be as follows.

2,2,4-Trimethyl-1,3-pentanediol which has an asymmetric molecular structure having a branch easily adsorbs onto a surface of a colorant in a recording liquid mainly composed of water. Also, 2,2,4-trimethyl-1,3-pentanediol, which has a relatively small molecular weight as compared with the surfactant, adsorbs onto a surface of the colorant at a high adsorption rate. Namely, when 2,2,4-trimethyl-1,3-pentanediol adsorbs to the surface of the colorant, the surface tension of the recording liquid is rapidly decreased as if a surfactant is added thereto.

However, 2,2,4-trimethyl-1,3-pentanediol has a small difference between hydrophilicity and hydrophobicity as compared with a surfactant, a large amount of 2,2,4-trimethyl-1,3-pentanediol must be added to obtain high penetrability with 2,2,4-trimethyl-1,3-pentanediol alone. A recording liquid containing a large amount of 2,2,4-trimethyl-1,3-pentanediol is not preferable because it has problems of low safety, phase separation, adsorption to a colorant, aggregation and so on.

It is also known that a polyoxyethylene alkyl ether surfactant and a polyoxyethylene alkyl ether acetate reduce surface tension and improve penetrability. However, since the surfactants do not necessarily have a high adsorption rate because of the size and shape of the molecules thereof, it is impossible to obtain sufficient penetrability therewith.

The present inventors have found that when 2,2,4-trimethyl-1,3-pentanediol is used together with polyoxyethylene alkyl ether surfactant and/or polyoxyethylene alkyl ether acetate surfactant, a significantly high penetration properties can be obtained by a synergistic effect with a small amount of addition, and has accomplish the present invention. There is also obtain an advantage that 2,2,4-trimethyl-1,3-pentanediol is an industrially advantageous material and treated in relatively in a large amount so that the recording liquid can be produced at a relatively low cost.

Description will be made of the amount to be added in the recording liquid.

The polyoxyethylene alkyl ether surfactant and/or the polyoxyethylene alkyl ether acetate surfactant is preferably added in an amount of not less than 0.01% by weight and not greater than 4% by weight based on the total amount of the recording liquid.

When the amount of polyoxyethylene alkyl ether surfactant and/or the polyoxyethylene alkyl ether acetate surfactant is less than 0.01% by weight, the penetrability of the recording liquid cannot be sufficiently improved. When the amount is greater than 4% by weight, the polyoxyethylene alkyl ether surfactant and/or the polyoxyethylene alkyl ether acetate surfactant is not stably dissolved in the recording liquid or increases the viscosity of the recording liquid even if dissolved therein, causing problems in storage stability and ejection stability in an ink jet system.

The polyoxyethylene alkyl ether surfactant and/or the polyoxyethylene alkyl ether acetate surfactant is more preferably added in an amount of not less than 0.05% by weight and not greater than 2% by weight.

2,2,4-Trimethyl-1,3-pentanediol is preferably added in an amount of not less than 0.1% by weight and not greater than 8% by weight based on the total amount of the recording liquid.

When the amount of 2,2,4-trimethyl-1,3-pentanediol is less than 0.1% by weight, the penetrability of the recording liquid is not sufficiently improved. When the amount is greater than 8% by weight, 2,2,4-trimethyl-1,3-pentanediol is not stably dissolved in the recording liquid, causing problems in storage stability and ejection stability in an ink jet system. 2,2,4-Trimethyl-1,3-pentanediol is more preferably added in an amount of not less than 0.5% by weight and not grater than 5% by weight.

2,2,4-Trimethyl-1,3-pentanediol has a low solubility in water and thus is easily separated under certain environmental conditions when added alone in a recording liquid. However, when 2,2,4-trimethyl-1,3-pentanediol is added in combination with the polyoxyethylene alkyl ether surfactant and/or the polyoxyethylene alkyl ether acetate surfactant, these are compatibilized with each other, whereby a stable recording liquid can be obtained.

When 2,2,4-trimethyl-1,3-pentanediol is mixed with the polyoxyethylene alkyl ether surfactant and/or the polyoxyethylene alkyl ether acetate surfactant, a higher penetrability of the recording liquid can be obtained in addition to the stability by a synergistic effect thereof with a smaller amount thereof as compared with a recording liquid in which 2,2,4-trimethyl-1,3-pentanediol or the surfactant is added alone. Also, the recording liquid has less solvent odor and higher safety as compared with a conventional recording liquid whose permeability is enhanced by adding a large amount of ethers of polyhydric alcohols.

Japanese Patent No. 2894568 proposes an ink jet ink comprising a composition containing water and a liquid medium containing not less than 60% by weight of water and 0.2 to 30% by weight of an alkylene glycol having 7 to 10 carbon atoms. It is, however, apparent that the bonding position of the hydroxyl group and the number of carbon atoms in the compound make a large difference in its hydrophilicity and the penetrability of an ink containing the compound.

2,2,4-Trimethyl-1,3-pentanediol according to the present invention is not shown as an example of usable compounds in Japanese Patent No. 2894568 but has been found among various compounds by the present inventors as a result of zealous studies. It is obvious that a recording liquid according to the present invention, in which 2,2,4-trimethyl-1,3-pentanediol is used in combination with the polyoxyethylene alkyl ether surfactant and/or the polyoxyethylene alkyl ether acetate surfactant, can have higher penetrability and anti-blur property than a recording liquid according to Japanese Patent No. 2894568, which merely refers that an alkylene glycol having 7 to 10 carbon atoms is effective.

In a bubble jet or thermal recording method in which recording is conducted by applying thermal energy to an ink and ejecting the ink as droplets from a minute pore, 2-propanol is conventionally added to a recording liquid to obtain ejection stability. When 2,2,4-trimethyl-1,3-pentanediol is added in place of 2-propanol, the wettability of the recording liquid to a thermal element is improved and high ejection stability and frequency stability can be obtained with a small amount of addition. Additionally, a problem concerning safety caused by use of 2-propanol is also solved.

The present inventors have also found that when 2-pyrolydone is added in a recording liquid, there can be obtained good effects of improving image density and preventing strike-through. This is thought to be because the recording liquid containing 2-pyrolydone wets and spreads well on a surface of a paper and is relatively restrained from penetrating into the paper in the thickness direction thereof so that the colorant tends to remain in a region adjacent the surface of the paper. 2-Pyrolydone is preferably added in an amount of 0.05 to 8% by weight, more preferably 0.5 to 4% by weight.

The present inventors have also found that, when a wetting agent is added to the recording liquid according to the present invention in an amount of 5 to 50% by weight for the purpose of preventing clogging of ejection nozzle caused by drying of the recording liquid and improving dissolution stability, clogging of an ejection port of an ink jet head hardly occurs and normal printing can be performed even when water in the recording liquid is evaporated. Even when clogging occurs, the ink jet head can be restored to normal printing conditions with a simple cleaning operation. As the wetting agent, a low-volatile water-soluble organic solvent is preferred.

The low volatile water-soluble organic solvent also serves as dissolution aid for the polyoxyethylene alkyl ether surfactant and/or the polyoxyethylene alkyl ether acetate surfactant (which will be hereinafter referred to as component (B)) and 2,2,4-trimethyl-1,3-pentanediol (which will be hereinafter referred to as component (A)) and thus can further improve the storage stability and ejection stability of the recording liquid.

Examples of the low-volatile water-soluble organic solvent include polyhydric alcohols such as ethylene glycol, diethylene glycol, triethylene glycol, tetraethylene glycol, propylene glycol, dipropylene glycol, tripropylene glycol, polyethylene glycol, polypropylene glycol, 1,3-butanediol, 2,3-butanediol, 1,4-butanediol, 1,5-pentanediol, 2-methyl-2,4-pentanediol, 1,6-hexanediol, glycerin, 1,2,6-hexanetriol, 1,2,4-butanetriol, 1,2,3-butanetriol, and petriol;

polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether;

polyhydric alcohol aryl ethers such as ethylene glycol monophenyl ether, and ethylene glycol monobenzyl ether;

a nitrogen-containing heterocycle compound such as 2-pyrolidone, N-methyl-2-pyrolidone, N-hydroxyethyl-2-pyrolidone, 1,3-dimethylimidazolidinone, $\epsilon$-caprolactam, and $\gamma$-butyrolactone;

amides such as formamide, N-methylformamide and N,N-dimethylformamide;

amines such as monoethanolamine, diethanolamine, triethanolamine, monoethylamine, diethylamine and triethylamine;

a sulfur-containing compound such as dimethyl sulfoxide, sulfolane, thiodiethanol, thiodiglycol;

propylene carbonate; and ethylene carbonate.

The solvents are used alone or in combination, as a mixture with water.

For a reason of compatibility with the components (A) and (B), glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrolidone, N-methyl-2-pyrolidone, N-hydroxyethyl-2-pyrolidone, or 1,3-dimethyl-2-imidazolidinone is preferred. For reasons of safety and price, glycerin or diethylene glycol, or a mixture thereof is especially preferred.

The low-volatile water-soluble organic solvent is preferably added to the recording liquid composition in an amount of not less than 5% by weight and not more than 50% by weight, more preferably not less than 8% by weight and not more than 30% by weight. When the amount of the low-volatile water-soluble organic solvent is less than 5% by weight, a sufficient effect of preventing water in the recording liquid from evaporating can not be obtained. Also, the effect as the dissolution aid may be insufficient and the storage stability and ejection stability of the recording liquid may be impaired, although it depends upon the contents of polyoxyethylene alkyl ether surfactant, polyoxyethylene alkyl ether acetate surfactant and 2,2,4-trimethyl-1,3-pentanediol. When the amount is over 50% by weight, the ejection stability of the recording liquid is lowered due to an increase in the viscosity thereof, or terrible cockling is apt to occur at printed image portions, as compared with the case where the content of the solvent is in the above range.

In order to obtain a high quality image by an ink jet recording method, adjustment of wettability of the recording liquid to a part constituting an ink jet head is an important factor. Thus, a surfactant may be additionally added to the recording liquid of the present invention for the purpose of adjusting the wettability thereof.

Examples of the surfactant include an anionic surfactant such as an ammonium salt of polyoxyethylene alkyl ether sulfate; a cationic surfactant such as quaternary ammonium salts; an ampholytic surfactant such as imidazoline derivatives; a nonionic surfactant such as polyoxyethylene alkyl phenyl ether, polyoxyethylene alkyl ester, polyoxyethylene alkylamine, polyoxyethylene alkylamide, sorbitan fatty acid ester, polyoxyethylene sorbitan fatty acid ester, ethylene oxide adducts of acetylene alcohol; and a fluorochemical surfactant.

The surfactant is preferably added in such an amount that adjusts the recording liquid to desired physical properties.

The colorant used in the present invention comprises a pigment and/or a dye.

As a water-soluble dye used as the colorant, dyes classified in color index into acid dyes, direct dyes, basic dyes, reactive dyes, and food dyes are employed. These dyes may be used alone or in combination, or may be mixed with other colorant such as a pigment when desired. The colorants may be added in such an amount that does not deteriorate the effect of the present invention.

Specific examples of acid dyes and food dyes include C.I. Acid Yellow 17, 23, 42, 44, 79, 142;

C.I. Acid Red 1, 8, 13, 14, 18, 26, 27, 35, 37, 42, 52, 82, 87, 89, 92, 97, 106, 111, 114, 115, 134, 186, 249, 254, 289;

C.I. Acid Blue 9, 29, 45, 92, 249;

C.I. Acid Black 1, 2, 7, 24, 26, 94;

C.I. Food Yellow 2, 3, 4;

C.I. Food Red 7, 9, 14; and

C.I. Food Black 1, 2.

Specific examples of direct dyes include C.I. Direct Yellow 1, 12, 24, 26, 33, 44, 50, 120, 132, 142, 144, 86;

C.I. Direct Red 1, 4, 9, 13, 17, 20, 28, 31, 39, 80, 81, 83, 89, 225, 227;

C.I. Direct Orange 26, 29, 62, 102;

C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Specific examples of basic dyes include

C.I. Basic Yellow 1, 2, 11, 13, 14, 15, 19, 21, 23, 24, 25, 28, 29, 32, 36, 40, 41, 45, 49, 51, 53, 63, 65, 67, 70, 73, 77, 87, 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Specific examples of reactive dyes include

C.I. Reactive Black 3, 4, 7, 11, 12, 17;

C.I. Reactive Yellow 1, 5, 11, 13, 14, 20, 21, 22, 25, 40, 47, 51, 55, 65, 67;

C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 80, 95.

As the dye, acid dyes or direct dyes are especially preferred because those have effects of improving the dissolution stability of the recording liquid and giving an excellent color tone, high water resistance and high photoresistance to a printed image.

The content of the dye as the colorant in the recording liquid is preferably 0.5 to 25% by weight, more preferably 2 to 15% by weight.

As the pigment for use in the present invention, an inorganic pigment or an organic pigment can be employed without a limitation on the type thereof. Since a pigment is not dissolved in a recording liquid but dispersed as particles therein in contrast to a dye, a recording liquid containing a pigment is not likely to penetrate deep into a paper as compared with a recording liquid containing a colorant other than a pigment and having the same penetration property. Thus, it is possible to obtain a high quality image with a high density and little strike-through.

As the inorganic pigment, titanium oxide, iron oxide, calcium carbonate, barium sulfate, aluminum hydroxide, barium yellow, cadmium red, or chrome yellow can be employed. In addition, a carbon black produced by a known method, such as a contact method, a furnace method, and a thermal method, can be also employed.

As the organic pigment, azo pigments (including azo lake, water-insoluble azo pigments, condensed azo pigments chelate azo pigments and so on); polycyclic pigments (such as phthalocyanine pigments, perylene pigments, perinone pigments, anthraquinone pigments, quinacrideone pigments, dioxazine pigments, indigo pigments, thioindigo pigments, isoindolinone pigments and quinophethalone pigments); dye chelates (such as basic dye-type chelates and acidic dye-type chelates); nitro pigments; nitroso pigments or aniline black can be employed. Above all, a pigment having a strong affinity for water is preferably employed. The content of the pigment as the colorant in the recording liquid is preferably 0.5 to 25% by weight, more preferably 2 to 15% by weight.

Examples of pigments preferably used in the present invention will be shown below but the present invention is not limited thereto. Examples of pigments for a black recording liquid include carbon blacks (C.I. pigment black 7) such as furnace black, lamp black, acetylene black, and channel black; metals such as copper, iron (C.I. Pigment Black 11), and titanium oxide; and organic pigments such as aniline black (C.I. Pigment Black 1).

Examples of pigments for a color recording liquid include

C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 153;

C.I. Pigment Orange 5, 13, 16, 17, 36, 43, 51;

C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (iron oxide red), 104, 105, 106, 108 (Cadmium Red), 112, 114, 122 (Quinacridone Magenta), 123, 146, 149, 166, 168, 170, 172, 177, 178, 179, 185, 190, 193, 209, 219;

C.I. Pigment Violet 1 (Rhodamine Lake), 3, 5:1, 16, 19, 23, 38;

C.I. Pigment Blue 1, 2, 15 (Phthalocyanine Blue), 15:1, 15:2, 15:3 (Phthalocyanine Blue) 16, 17:1, 56, 60, 63; and C.I. Pigment Green 1, 4, 7, 8, 10, 17, 18, 36.

In the present invention, carbon black is preferably employed as the black pigment. As a pigment for a black recording liquid, carbon black is excellent in tone, has high water resistance, photoresistance and dispersion stability, and is inexpensive.

A graft pigment, which is a pigment (carbon, for example) surface-treated with a resin or the like so that the pigment may be dispersed in water, or a processed pigment, which is a pigment (carbon, for example) having a surface to which a functional group such as a sulfone group or a carboxyl group is added so that the pigment may be dispersed in water, may be also employed.

The pigment may be contained in microcapsules so that the pigment may be dispersed in water.

In the aqueous recording liquid according to the present invention preferably is dispersed a pigment having an average particle size in the range of 10 to 200 nm. The term "average particle size" herein means a diameter at a cumulative volume of 50%. The diameter at a cumulative volume of 50% can be measured by a dynamic light scattering method (Doppler scattering light analytic method), in which laser beam is irradiated on a particle performing Brownian movement in a recording liquid and the diameter of the particle is obtained from a change in frequency of the light coming back from the particle (back scattered light).

As a grain size analyzer employing the system, Microtrac UPA 150 grain size analyzer manufactured by Honeywell Inc. can be used.

When a pigment is employed as the colorant, the resulting recording liquid has improved water resistance and photoresistance. Additionally, a phenomenon in which the recording liquid penetrates the layer of the recording medium to the reverse side thereof (which will be hereinafter referred to as "strike-through") can be prevented. Since the pigment is not dissolved but dispersed in the recording liquid, the pigment component does not penetrate into the recording medium less than the liquid component of the recording liquid does but remains in a region adjacent the surface thereof when printing is conducted with an ink jet system. Thus, the image dries quickly and strike-through can be prevented.

When the average particle size of the pigment is less than 10 nm, the effect of preventing strike-through can not be obtained. When the average particle size is over 200 nm, the recording liquid has poor dispersion stability. Thus, the particle size is enlarged by aggregation and so on during storage so that the ejection stability of the recording liquid may be poor as compared with a pigment having an average particle size in the above range.

The pigment is preferably added to the recording liquid in the form of a pigment dispersion prepared by dispersing the pigment in an aqueous medium with the aid of a dispersant. As the dispersant, any conventionally known dispersant for use in preparation of a pigment dispersion such as hydrophilic polymers including natural polymers, semisynthetic polymers and pure synthetic polymers.

Examples of the natural polymer include a plant polymer such as Arabian gum, tragacanth gum, guar gum, karaya gum, locust bean gum, arabinogalactan, pectin, and quince seed starch;

a seaweed polymer such as alginic acid, carrageenen, and agar;

an animal polymer such as gelatin, casein, albumin, and collagen; and a microbial polymer such as xanthene gum, and dextran.

Examples of the semisynthetic polymer include a cellulose polymer such as methyl cellulose, ethyl cellulose, hydroxy ethyl cellulose, hydroxy propyl cellulose, and carboxymethyl celllulose;

a starch polymer such as sodium starch glycolate, and sodium starch phosphate;

and a seaweed polymer such as sodium alginate, and propylene glycol ester alginate.

Examples of the pure synthetic polymer include polyacrylic acid, polymethacrylic acid, acrylic acid-acrylonitrile copolymer, vinyl acetate-acrylic ester copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, copolymer of styrene-α-methylstyrene-acrylic acid copolymer with alkyl acrylate, styrene-maleic acid copolymer, vinylnaphthalene-maleic acid copolymer, vinyl acetate-ethylene copolymer, vinyl acetate-fatty acid vinylethylene copolymer, vinyl acetate-maleic ester copolymer, vinyl acetate-crotonic acid copolymer, and vinyl acetate-acrylic acid copolymer.

The average molecular weight of the copolymer is preferably about 3,000 to 50,000, more preferably about 5,000 to 30,000, most preferably about 7,000 to 15,000. The polymeric dispersant may be added in any amount as long as the pigment can be stably dispersed and the other effects of the present invention are not lost.

The weight ratio of the pigment to the dispersant is about 1:0.06 to 1:3, more preferably about 1:0.125 to 1:3.

A water-soluble surfactant may be also used as the pigment dispersant. Since a water-soluble surfactant increases less viscosity of the recording liquid than the same amount of a polymeric dispersant does, a pigment ink which exhibits good ejection property when used in ink jet recording system can be easily obtained.

Specific examples of water-soluble surfactants usable as a pigment dispersant include anionic surfactants such as alkylallyl, alkylnaphthalene sulfonate, alkyl phosphate, alkyl sulfate, alkyl sulfonate, alkylether sulfate, alkyl sulfosuccinate, alkyl ester sulfate, alkylbenzen sulfonate, alkyldiphenyl ether disulfonate, alkyl arylether phosphate, alkyl arylether sulfate, alkyl arylether ester sulfate, olefin sulfonate, alkane olefin sulfonate, polyoxyethylene alkyl ether phosphate, polyoxyethylene alkylether ester sulfate, ether carboxylate, sulfosuccinate, α-sulfo fatty acid ester, fatty acid salts, a condensate of a higher fatty acid with an amino acid, and naphthenate;

cationic surfactants such as alkylamine salts, dialkylamine salts, aliphatic amine salts, benzalkonium salts, quaternary ammonium salts, alkylpyridinium salts, imidazolinium salts, sulfonium salts, and phosphonium salts;

nonionic surfactant such as polyoxyethylene alkyl ether, polyoxyethylene alkylallyl ether, polyoxyethylene alkylphenyl ether, polyoxyethylene glycol ester, polyoxyethylene fatty acid amide, polyoxyethylene fatty acid ester, polyoxyethylene polyoxypropylene glycol, glyceroester, sorbitan ester, sucrose ester, polyoxyethylene ether of glyceroester, polyoxyethylene ether of sorbitan ester, polyoxyethylene ether of sorbitol ester, aliphatic alkanolamid, amine oxide, polyoxyethylene alkylamine, glycerin fatty acid ester, sorbitan fatty acid ester, polyoxyethylene sorbitan fatty acid ester, polyoxyethylene sorbitol fatty acid ester, and alkyl (poly) glycoxyde; and ampholytic surfactant such as imidazoline derivatives including imidazolinium betaine; dimethylalkyllauryl betaine, alkylglycine, and alkyldi(aminoethyl)glycine.

The surfactant as the dispersant may be added in any amount as long as the pigment can be stably dispersed and the other effects of the present invention are not lost.

More preferably, the dispersant for the recording liquid has a carboxyl group. When the dispersant has a carboxyl group, not only the dispersion stability is improved but also a high printing quality can be obtained. Additionally, there can be obtained effects of enhancing water resistance of the recording medium after printing and preventing strike-through as mentioned before. Especially, when a pigment dispersed with a dispersant having a carboxyl group is used together with the components (A) and (B), a sufficient drying rate and an effect of decreasing strike-through can be obtained even when printing is conducted on a recording medium having a relatively high sizing degree such as a plain paper. The reason of this is assumed to be as follows; Since the dissociation constant of carboxylic acid is smaller than those of other acid groups, when the solubility of the dispersant is lowered due to decrease of pH of the recording liquid and an interaction with ions of polyvalent metals such as calcium present in a region adjacent a surface of the recording medium after the pigment has adhered to the recording medium, the dispersant itself and the pigment are aggregated.

Preferably, in the aqueous recording liquid according to the present invention, a pigment having a modified surface to which a carboxyl group is bonded is dispersed in water. In this case, since the pigment has a modified surface to which a carboxyl group is bonded, not only the dispersion stability is improved but also a high printing quality can be obtained by similar functions as above and the water resistance of the recording medium after printing is much improved. Additionally, an aqueous recording liquid of this type has high redispersibiliry after drying. Thus, it causes no clogging of a nozzle of an ink jet head and allows printing with good printing quality with a simple cleaning operation even when water in the recording liquid in the vicinity of the nozzle is evaporated during a long time suspension of printing operation.

The aqueous recording liquid according to the present invention is applicable to bar code printing and postmark printing using an invisible recording liquid, which are rapidly spreading in recent years. In this case, an infrared absorber or an ultraviolet absorber having absorption not in visible region but in infrared region or ultraviolet region is added in the recording liquid instead of an ordinary dye or pigment.

The aqueous recording liquid according to the present invention may contain conventionally known additives in addition to the colorant, the wetting agent and the surfactant in such an amount that does not deteriorate the effects of the present invention.

For example, the aqueous recording liquid according to the present invention may contain a resin emulsion. The resin emulsion usable herein comprises water as a continuous phase and a resin component as shown below as a dispersed phase.

Examples of the resin component as the dispersed phase include acrylic resin, vinyl acetate resin, styrene-butadiene resin, vinyl chloride resin, acryl-styrene resin, butadiene resin, and styrene resin. The resin is preferably a polymer having both a hydrophilic segment and a hydrophobic segment. The particle size of the resin component is not particularly limited as long as the resin component can form an emulsion but is preferably not more than about 150 nm, more preferably about 5 to 100 nm.

The resin emulsion can be obtained by mixing resin particles into water, together with a surfactant as desired.

Examples of commercially available resin emulsions include Microgel E-1002 and E-5002 (emulsion of styrene-acryl resin, manufactured by Nippon Paint Co., Ltd.), Voncoat 4001 (emulsion of acrylic resin, manufactured by Dainippon Ink and Chemicals, Inc.), Voncoat 5454 (emulsion of styrene-acryl resin, manufactured by Dainippon Ink and Chemicals, Inc.), SAE-1014 (emulsion of styrene-acryl resin, manufactured by Nippon Zeon Co., Ltd.), and Saivinol SK-200 (emulsion of acrylic resin, manufactured by Saiden Chemical Industry Co., Ltd).

The aqueous recording liquid according to the present invention preferably contains a resin emulsion in an amount of 0.1 to 40% by weight, more preferably 1 to 25% by weight, based on a total weight of the aqueous recording liquid.

The resin emulsion has properties of increasing viscosity and aggregating so that it has effects of inhibiting the penetration of a coloring component in the depth direction of a paper and accelerating the fixation of the colorant component on the recording medium. Some resin emulsions have an additional effect of forming a film on the recording medium which improves the scratch resistance of a printed image.

The recording liquid composition of the aqueous recording liquid according to the present invention may contain a saccharide such as monosaccharides, disaccharides, oligosaccharides (including trisaccharides and tetrasaccharides), and other polysaccharides for the purpose of preventing evaporation of water and so on. Preferred examples include glucose, mannose, fructose, ribose, xylose, arabinose, galactose, maltose, cellobiose, lactose, sucrose, trehalose, and maltotriose. The term "polysaccharides" used herein means saccharides in the broad sense as including substances which exist widely in the world of nature, such as $\alpha$-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thioic acid. Above all, sugar alcohols are particularly preferred, and specific examples thereof include maltitol and sorbitol.

The content of the saccharide is 0.1 to 40% by weight, preferably 0.5 to 30% by weight, based on the amount of the recording liquid composition.

The aqueous recording liquid according to the present invention may contain sodium alginate. Sodium alginate is a hydrophilic polyelectrolyte which is contained in only blown algae and which is present as a cell membrane material or an intercellular material. In a chemical sense, it is a polymer of D-mannuronic acid [M] which is polymerized through $\beta$-1 and 4 bonds and L-guluronic acid [G] which polymerized through $\alpha$-1 and 4 bonds and has viscosity-increasing effect, stabilizing effect, dispersing effect, gelatinization effect, film-forming effect and so on. When added in an ink jet recording liquid, sodium alginate causes a change in pH of the recording liquid to change in viscosity thereof, deposition of salts, gelatinization with multivalent cations, and thus can prevent blur of a single color (feathering) and blur between different colors.

The aqueous recording liquid according to the present invention may contain an antiseptic and antifungal agent such as sodium dehydroacetate, sodium sorbate, 2-pyridinethiol-1-oxide sodium, sodium benzoate, sodium pentachlorophenol, or the like.

The aqueous recording liquid according to the present invention may contain any substance as a pH regulator as long as it can adjust the pH of the aqueous recording liquid to a desired value without giving an adverse effect on the aqueous recording liquid.

Examples of such substances include amines such as diethanolamine and triethanolamine; a hydroxide of an alkali metal element such as lithium hydroxide, sodium hydroxide and potassium hydroxide; ammonium hydroxide; quaternary ammonium hydroxide; quaternary phosphonium hydroxide; and a carbonate of an alkali metal element such as lithium carbonate, sodium carbonate and potassium carbonate.

Examples of chelate reagents include sodium ethylenediaminetetraacetate, sodium nitrilotriacetate, sodium hydroxyethyl ethylenediaminetriacetate, sodium diethylenetriaminepentaacetate and sodium uramild iacetate.

The aqueous recording liquid according to the present invention may contain a rust preventive such as acid sulfite, sodium thiosulfate, ammonium thiodiglycolate, diisopropyl ammonium nitrate, pentaerythritol tetranitrate, dicyclohexyl ammoium nitrate or the like.

The aqueous recording liquid may contain a water-soluble ultraviolet absorber depending upon the purpose thereof.

The aqueous recording liquid according to the present invention can be preferably used in an ink jet recording system for forming a color image on a recording medium by ejecting or jetting an aqueous recording liquid from a minute ejection port onto the recording medium. It is, however, needless to say that the aqueous recording liquid according to the present invention can be also used as a recording liquid for general writing utensils such as an aqueous ink pen, aqueous ink marker, aqueous ink ball point pen, a recorder, and a pen plotter. Additionally, the aqueous recording liquid according to the present invention is not limited to the above usage.

The aqueous recording liquid according to the present invention must be adjusted to a desired viscosity when used in ink jet recording system. The viscosity of the aqueous recording liquid must be varied depending on the ejecting force of a head but preferably not greater than 10 mP·a in general. When the viscosity is greater than 10 mP·a, the aqueous recording liquid can not be sufficiently ejected by an ink jet system and tends to cause image deterioration.

A recording method preferably employed as a recording method of the present invention is a method in which thermal energy corresponding to a recording signal is applied to the recording liquid to generate droplets thereof, with which an image is formed on a recording medium.

Preferably, the recording medium is mainly composed of pulp fibers and has a sizing degree of at least 50 s and an air-permeability of 5 to 50 s. When printing is conducted on both sides of such a recording medium using the aqueous recording liquid according to the present invention, the image printed on the reverse side of the recording medium never interferes with recognition of the image printed on the front side thereof. The sizing degree herein is a value measured according to the Steckigt sizing degree testing method of JIS P8122-76 and the air-permeability herein is a value measured according to air-permeability testing method of JIS P8117-80.

When the sizing degree is less than 10 s, the recording liquid penetrates to the reverse side of the recording medium and strike-through occurs. When the permeability is less than 5 s, the recording liquid also penetrates to the reverse side of the recording medium and strike-through occurs. A recording medium having a sizing degree of greater than 50 s causes no problem in the printing quality and the drying property of the recording liquid but expensive because it contains a filler more than necessary.

Also, when a recording medium having a sizing degree and an air-permeability outside the above range is used in an electronic copying machine or printer, the filler is transferred to a photoreceptor or a fixing roller, causing deterioration of image quality or a breakdown of the machine. Thus, users must use papers designed specifically for ink jet recording, which requires the users to use different types of papers depending upon the type of a machine, imposing a burden upon the users. When a recording medium having a sizing degree and an air-permeability in the above range is employed, the user can deal with it in the same way as in other non-coated plain papers such as a transfer paper for electrophotography, a printing paper, a typewriter paper, a wire dot printer paper, a word processor paper, a letter paper, and a reporting paper so that the user does not have to distinguish a paper for ink jet recording from other plain papers. With respect to the production, the recording medium can be produced using an existing paper making machine with a minimum equipment investment. Also, the recording medium can be commonly applied to uses of other recording system.

As the material of pulp fibers for use in the present invention, any pulp can be used irrespective of the type and treatment method thereof as long as it has no adverse effect on an ink jet recording system. Non-wood pulp (kenuf pulp, flux pulp, bamboo pulp, seaweed pulp or the like) or recycled paper pulp can be added, or may be used as the main component. A preferred example is a chemical pulp represented by LBKP and NBKP. These pulps are made into papers by an ordinary method as is the case with a general plain paper, using a known sizing agent, a filler and other paper-making aids as necessary.

Examples of the sizing agent include rosin size, AKD, sodium chloride, potassium chloride, stylene-maleic acid copolymer, quaternary ammonium salts, alnickel succinic anhydride, petroleum resin-based sizes, epichlorohidon, cationic starch, and acrylamide.

Examples of the filler include clay, calcium carbonate, talc, titanium dioxide, and synthetic silica.

Also, a paper strengthening agent, a yield improver, a fixing agent, a dye and other paper-making aids may be added.

As a result of zealous studies, the present inventor have found that, when printing is conducted under the condition that an ejection volume per droplet (V) ejected from an recording head satisfies the equation (3), a high-quality image with little strike-through, a uniformity in solid part and without a white void;

$$2.5 \times 10^8/R^{2\cdot 6} \leq V \leq 6.0 \times 10^8/R^{2\cdot 6} \qquad (3)$$

wherein R is a density at which ink droplets are dotted in recording on a recording medium mainly composed of pulp fibers and having a sizing degree of at least 10 s and air-permeability of 5 to 50 s and expressed by a number of dots per a unit length using a unit of dpi (Dot Per Inch). In some serial type ink jet printers, the dot density in a scanning direction (main scanning direction) and the dot density in a paper transporting direction (sub-scanning direction) are different. In such a case, a value obtained by calculating such that the number of dots in the main scanning direction and the number of the dots in the sub-scanning direction may be the same in a unit area.

The left side of the equation (3) shows a relation suitable for obtaining a high-quality image with a high density and without a white streak when a solid image is printed a plain paper. The right side of the equation (3) shows a relation suitable for preventing an increase of strike-through and occurrence of blur caused by adhering an excessive amount of the recording liquid. Neither of the relations can be established without the excellent penetrability for a plain paper of the recording liquid according to the present invention.

The recording liquid according to the present invention, which has high penetrability and thus allows printing of a high quality image without blur, can be applied to a high-speed recording process, which was difficult to accomplish with an ordinary recording liquid. Namely, in a recording method of forming an image on a recording medium by ejecting and jetting a plurality of aqueous recording liquids as droplets from one ejection nozzle or separated ejection nozzles such that at least a part of adjacent pixel areas are overlapped on the recording medium, when the two droplets of the aqueous recording liquids which forms the pixel areas to be partially overlapped on the recording medium are ejected with a time difference of not greater than 0.125 ms, a extremely high speed printing can be accomplished.

In recent years, the technology concerning an ink jet printer has significantly progressed and the printing speed has been improved. However, in order to maintain the image quality above a certain level, two adjacent dots are not continuously formed but one of the dots is not formed until the other has penetrated into the paper. Namely, high quality printing is accomplished by a method called multipass printing, sacrificing the printing speed. The aqueous recording liquid according to the present invention exhibits high penetration property and thus allows printing of a high quality image by single-pass printing, which was conventionally impossible.

Description will be hereinafter made of a recording liquid cartridge containing the aqueous recording liquid according to the present invention and an ink jet recording apparatus including the recording liquid cartridge with reference to the appended drawings. The following is only one example and is not intended to limit the present invention.

FIG. 1 is a schematic front view of a mechanism section of a serial type ink jet recording apparatus mounting an ink cartridge having a recording liquid containing part containing the recording liquid according to the present invention.

The mechanism section of the ink jet recording apparatus has side plates 1 and 2 on both sides thereof and a main support guide rod 3 and a sub-support guide rod 4 extending generally horizontally between the side plates 1 and 2. A carriage unit 5 is supported by the main support guide rod 3 and the sub-support guide rod 4 for sliding movement in a main scanning direction. Four heads 6 each for ejecting a yellow (Y) ink, a magenta (M) ink, a cyan (C) ink and a black (Bk) ink are mounted on the carriage unit 5 with ejection surfaces 6a (nozzle surfaces) thereof facing down. Four ink cartridges 7y, 7m, 7c, and 7k, each of which is a ink supplying body for supplying the respective ink to the corresponding head 6, are exchangeably mounted above each of the heads 6 of the carriage unit 5. The carriage unit 5 is connected to a timing belt 11 stretched between a driving pulley (driving timing pulley) 9, which is rotated by a main scanning motor 8, and a driven pulley (idler pulley) 10. By driving the main scanning motor 8, the carriage unit 5, namely the four heads 6 are moved in the main scanning direction.

Sub-frames 13 and 14 are erected on a bottom plate 12 connecting the side plates 1 and 2. A transporting roller 15 for feeding a paper 16 in a sub-scanning direction, which is perpendicular to the main scanning direction, is rotatably supported between the sub-frames 13 and 14. A sub-scanning motor 17 is arranged aside the sub-frame 14. A gear 18 fixed on a rotating shaft of the sub-scanning motor 17 and a gear 19 fixed on the transporting roller 15 are provided so as to transmit rotation of the sub-scanning motor 17 to the transporting roller 15.

Between the side plate 1 and the sub-frame 12 is arranged a reliability maintaining/recovering mechanism 21 (which will be hereinafter referred to as "sub-system"). The sub-system 21 has a holder 23 for holding four capping means 22 for capping ejection surfaces 6a of the heads 6, respectively. The holder 23 is swingably held by linking members 24.

When the carriage unit 5 is moved in the main scanning direction and brought into contact with an engaging portion 25 provided on the holder 23, the holder 23 is lifted up along with the movement of the carriage unit 5 and the ejection surfaces 6a of the ink jet heads 6 are capped with the capping means 22. When the carriage unit 5 is moved to the side of a printing area, the holder 23 is lifted down along with the movement of the carriage unit 5, whereby the capping means 22 are removed from the ejection faces 6a of the ink jet heads 6.

Each of the capping means 22 is connected to a suction pump 22 via a suction tube 26 and has an open air port communicated with the atmosphere via an open air tube and an open air valve. The suction pump 22 discharges sucked waste liquid into a waste liquid tank (not shown) via a drain tube or the like.

On one side of the holder 23, a blade arm 29 carrying a wiper blade 28, which is wiping means comprising an elastic material such as fiber, a foam or a rubber, for wiping the ejection surfaces 6a of the ink jet heads 6 is swingably pivoted. The blade arm 29 is swung by rotation of a cam which is rotated by driving means (not shown).

Figure 2:
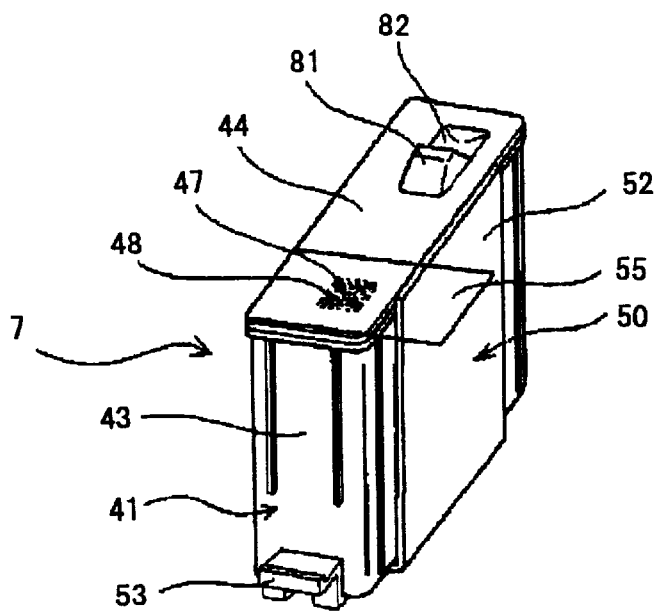
FIG. 2 is a perspective view of an external appearance of the ink cartridge before lorded in the recording apparatus of FIG. 1.
Figure 3:
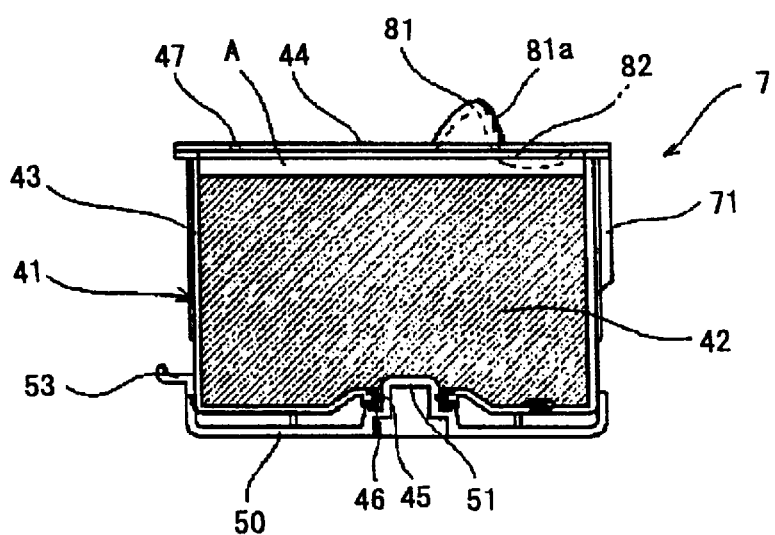
FIG. 3 is a front cross-sectional view of the ink cartridge of FIG. 2.

Description will be next made of an ink cartridge 7 with reference to FIG. 2 and FIG. 3. FIG. 2 is a perspective view of an external appearance of the ink cartridge before being loaded in the recording apparatus and FIG. 3 is a front cross-sectional view of the ink cartridge.

As shown in FIG. 3, the ink cartridge 7 comprises a cartridge body 41 accommodating an ink absorber 42 containing an ink of a required color. The cartridge body 41 comprises a case 43 having a wide opening at a top part thereof and an upper cover member 44 melt-bonded or adhered over the opening, and made of, for example, a resin molded product. The ink absorber 42 comprises a porous body such as urethane foam and is inserted into the cartridge body 41 under compression. Then, the ink is poured into the cartridge body 41 such that the ink absorber 41 may absorb the ink.

The case 43 of the cartridge body 41 has a bottom having an ink supply port 45 for supplying the ink to the recording head 6. The ink supply port 45 has an inner circumference surface on which a seal ring 46 is fitted. The upper cover member 44 has an open air port 47.

The cartridge body 41 has a cap member 50 for closing the ink supply port 45 before the cartridge 7 is loaded into the printer in order to prevent the ink from leaking when the case 43 is deformed by a pressure exerted on side walls thereof having a relatively large width at the time of treating the cartridge such as loading into the printer or transporting, or at the time of vacuum packing.

As shown in FIG. 2, a film-like seal member 55 having an oxygen permeability of not less than 100 ml/m$^2$ is adhered on the upper cover member 44, whereby the open air port 47 is sealed. The seal member 55 is so sized as to seal a plurality of grooves 48 formed around the open air port 47 together with the open air port 47. When the open air port 47 is sealed with the seal member 55 having an oxygen permeability of not less than 100 ml/m$^2$ and the ink cartridge 7 is packaged with a packaging material having no air permeability such as an aluminum-laminated film under a reduced pressure, even if gas is dissolved in the ink at the time of filling the ink or by air contained in a space A (see FIG. 3) formed between the ink absorber 42 and the cartridge body 41, the air dissolved in the ink is discharged into a space high in vacuum degree between the cartridge body 41 and the packaging member through the seal member 55, thereby enhansing deaeration degree of the ink.

Figure 4:
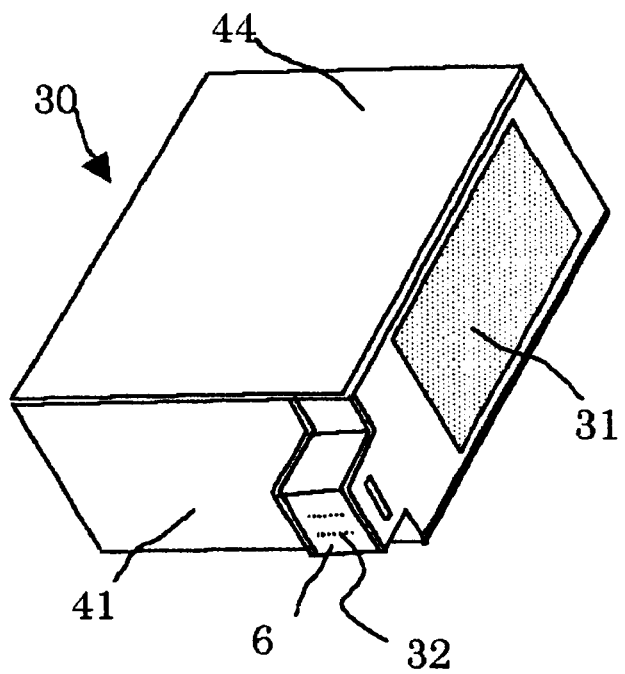
FIG. 4 is a perspective view of an external appearance of the recording unit integrated with a recording head.

One embodiment of a recording liquid containing part containing the recording liquid according to the present invention and a recording cartridge having a head part for ejecting droplets of the recording liquid is shown in FIG. 4 and description thereof will be hereinafter made.

A recording unit 30 is a serial type recording unit and has a main part comprising an ink jet head 6, an ink tank 41 containing a recording liquid to be supplied to the ink jet head 6, and a cover member for airtightly closing the ink tank 41. A multiplicity of nozzles 32 for ejecting the recording liquid are formed in the ink jet head 6. The recording liquid is introduced from the ink tank 41 through an ink supply tube (not shown) to a common liquid chamber (not shown) and ejected from the nozzles 32 in response to electric signals from a main body inputted through an electrode 31. The recording unit of this type has a structure suitable for a head which can be produced at a low price, namely a head using thermal energy as power source for driving, called thermal system or bubble system head. The recording liquid of the present invention has an improved wettability to a thermal element of a bubble or thermal recording system by containing the component (A). Also, the component (A) imparts high ejection stability and frequency stability to the recording liquid with a small amount so that the recording liquid has high safety. Therefore, the recording liquid according to the present invention is highly suitable for such recording systems.

Description has been herein made taking a serial type ink jet recording apparatus as an example, the recording liquid according to the present invention is applicable to a recording apparatus having a so-called line head in which a plurality of nozzles are integrated at a density equivalent to or in a fraction of a resolution that of an purposed image and arranged in an arbitrary fashion such as a zigzag fashion and in a width which is greater than that of a recording medium.

The recording apparatus herein may be a multi-function apparatus combined with a fax machine, a scanner and so on as well as an output printer for a PC or a digital camera.

Examples and comparative examples of the present invention will be hereinafter shown but those are not intended to limit the present invention. Percentages are by weight.

EXAMPLE 1

The following ink ingredients were mixed and stirred. The mixture was adjusted to pH 8 with 10% aqueous solution of lithium hydroxide and then filtered with a membrane filter having an average aperture size of 0.1 µm, thereby obtaining an ink composition 1.

| Ink composition 1 | |
|---|---|
| C.I. Direct Black 168 | 4% |
| Glycerin | 5% |
| Ethylene glycol | 5% |
| Compound (1-4) | 0.3% |
| 2,2,4-Trimethyl-1,3-pentanediol | 1% |
| Ion-exchanged water | Balance |

EXAMPLE 2

An ink composition 2 was prepared in the same manner as in Example 1 except that the following compositions were used and that the mixture was adjusted to pH 7.5 with sodium hydroxide.

| Ink composition 2 | |
|---|---|
| C.I. Direct Yellow 142 | 3.0% |
| Thiodiglycol | 8% |
| Compound (1-5) | 0.5% |
| 2,2,4-Trimethyl-1,3-pentanediol | 3% |
| Ion-exchanged water | Balance |

EXAMPLE 3

An ink composition 3 was prepared in the same manner as in Example 1 except that the following compositions were used and that the mixture was adjusted to pH 8 with 10% aqueous solution of lithium hydroxide.

| Ink composition 3 | |
|---|---|
| C.I. Direct Red 227 | 3% |
| Thiodiglycol | 8% |
| Compound (1-6) | 0.5% |
| 2,2,4-Trimethyl-1,3-pentanediol | 2% |
| Ion-exchanged water | Balance |

EXAMPLE 4

An ink composition 4 was prepared in the same manner as in Example 1 except that the following compositions were used and that the mixture was adjusted to pH 9 with 10% aqueous solution of lithium hydroxide.

| Ink composition 4 | |
|---|---|
| C.I. Direct Blue 199 | 3% |
| Thiodiglycol | 8% |
| Compound (1-5) | 0.5% |
| 2,2,4-Trimethyl-1,3-pentanediol | 3% |
| Ion-exchanged water | Balance |

EXAMPLE 5

The following ingredients of a dispersion were mixed using a bead mill, whereby carbon black was dispersed therein. The thus obtained aqueous dispersion was mixed and stirred with the other ink ingredients. The mixture was adjusted to pH 8 with 10% aqueous solution of lithium hydroxide and then filtered with a membrane filter having an average aperture size of 0.8 µm, thereby obtaining an ink composition 5.

| Pigment dispersion 1 | |
|---|---|
| Carbon black (average particle size: 104 nm) | 15% |
| Styrene-acrylate-diethanolamine methacrylate terpolymer | 3% |
| Ion-exchanged water | Balance |
| Ink composition 5 | |
| Pigment dispersion 1 | 33.3% |
| Diethylene glycol | 6.5% |
| Glycerin | 3.5% |
| Compound (1-1) | 0.3% |
| Compound (1-3) | 0.1% |
| 25% Aqueous solution of compound (13-3) | 0.5% |
| 2,2,4-Trimethyl-1,3-pentanediol | 2% |
| 2-Pyrolidone | 2% |
| Ion-exchanged water | Balance |

EXAMPLE 6

A pigment dispersion 2 was prepared in the same manner as in Example 5 except that the following compositions were used. Using the thus obtained pigment dispersion 2, an ink composition 6 was obtained.

| Pigment dispersion 2 | |
|---|---|
| Carbon black (average particle size: 104 nm) | 15% |
| Styrene-acrylate-diethanolamine methacrylate terpolymer | 3% |
| Ion-exchanged water | Balance |
| Ink composition 6 | |
| Pigment dispersion 2 | 33.3% |
| Ethylene glycol | 6.5% |
| N-methyl-2-pyrolidone | 3.5% |
| Compound (1-1) | 0.3% |
| 25% Aqueous solution of compound (13-4) | 0.5% |
| 2,2,4-Trimethyl-1,3-pentanediol | 3% |
| 2-Pyrolidone | 2% |
| Alkyl ester fluoride; nonionic surfactant | 0.3% |
| Ion-exchanged water | Balance |

EXAMPLE 7

A pigment dispersion 3 was prepared in the same manner as in Example 5 except that the following compositions were used. Using the thus obtained pigment dispersion 3, an ink composition 7 was obtained.

| Pigment dispersion 3 | |
|---|---|
| Carbon black (average particle size: 99 nm) | 15% |
| Formalin condensate of naphthalene sulfonate | 3% |
| Ion-exchanged water | Balance |
| Ink composition 7 | |
| Pigment dispersion 3 | 33.3% |
| Polyethylene glycol (molecular weight: 200) | 15% |
| Compound (1-3) | 0.05% |

-continued

| | |
|---|---|
| 25% Aqueous solution of compound (13-2) | 0.1% |
| 2,2,4-Trimethyl-1,3-pentanediol | 5% |
| Alkyl ester fluoride; nonionic surfactant | 0.3% |
| Ion-exchanged water | Balance |

EXAMPLE 8

A pigment dispersion 4 was prepared in the same manner as in Example 5 except that the following compositions were used. Using the thus obtained pigment dispersion 4, an ink composition 8 was obtained.

| Pigment dispersion 4 | |
|---|---|
| C.I. Pigment Yellow 13 (average particle size: 117 nm) | 15% |
| Styrene-acrylate-diethanolamine methacrylate terpolymer | 3% |
| Ion-exchanged water | Balance |
| Ink composition 8 | |
| Pigment dispersion 4 | 33.3% |
| Glycerin | 5% |
| Diethylene glycol | 10% |
| Compound (1-2) | 0.3% |
| 25% Aqueous solution of compound (13-4) | 0.5% |
| 2,2,4-Trimethyl-1,3-pentanediol | 3% |
| 2-Pyrolidone | 2% |
| Ion-exchanged water | Balance |

EXAMPLE 9

A pigment dispersion 5 was prepared in the same manner as in Example 5 except that the following compositions were used. Using the thus obtained pigment dispersion 5, an ink composition 9 was obtained.

| Pigment dispersion 5 | |
|---|---|
| C.I. Pigment Yellow 74 (average particle size: 96 nm) | 15% |
| Formalin condensate of naphthalene sulfonate | 3% |
| Ion-exchanged water | Balance |
| Ink composition 9 | |
| Pigment dispersion 5 | 33.3% |
| Polyethylene glycol (molecular weight: 200) | 10% |
| Compound (1-7) | 0.05% |
| 2,2,4-Trimethyl-1,3-pentanediol | 5% |
| Ion-exchanged water | Balance |

EXAMPLE 10

A pigment dispersion 6 was prepared in the same manner as in Example 5 except that the following compositions were used. Using the thus obtained pigment dispersion 6, an ink composition 10 was obtained.

| Pigment dispersion 6 | |
|---|---|
| C.I. pigment red 122 (average particle size: 120 nm) | 15% |
| Styrene-acrylate-diethanolamine methacrylate terpolymer | 3% |
| Ion-exchanged water | Balance |

-continued

| Ink composition 10 | |
|---|---|
| Pigment dispersion 6 | 33.3% |
| Glycerin | 5% |
| Ethylene glycol | 10% |
| Compound (1-1) | 0.3% |
| 25% Aqueous solution of compound (13-4) | 0.5% |
| 2,2,4-Trimethyl-1,3-pentanediol | 2% |
| 2-Pyrolidone | 2% |
| Ion-exchanged water | Balance |

EXAMPLE 11

A pigment dispersion 7 was prepared in the same manner as in Example 5 except that the following compositions were used. Using the thus obtained pigment dispersion 7, an ink composition 11 was obtained.

| Pigment dispersion 7 | |
|---|---|
| C.I. pigment red 57:1 (average particle size: 115 nm) | 15% |
| Formalin condensate of naphthalene sulfonate | 3% |
| Ion-exchanged water | Balance |
| Ink composition 11 | |
| Pigment dispersion 7 | 33.3% |
| Polyethylene glycol (molecular weight: 200) | 10% |
| Compound (1-8) | 0.05% |
| 2-Methyl-1,3-hexanediol | 1% |
| 2,2,4-Trimethyl-1,3-pentanediol | 1% |
| 2-Pyrolidone | 2% |
| Ion-exchanged water | Balance |

EXAMPLE 12

A pigment dispersion 8 was prepared in the same manner as in Example 5 except that the following compositions were used. Using the thus obtained pigment dispersion 8, an ink composition 12 was obtained.

| Pigment dispersion 8 | |
|---|---|
| C.I. Pigment Blue 15:3 (average particle size 123 nm) | 15% |
| Styrene-acrylate-diethanolamine methacrylate terpolymer | 3% |
| Ion-exchanged water | Balance |
| Ink composition 12 | |
| Pigment dispersion 8 | 33.3% |
| Glycerin | 3% |
| 1,5-pentanediol | 15% |
| Compound (1-4) | 0.3% |
| 25% Aqueous solution of compound (13-4) | 0.5% |
| 2,2,4-Trimethyl-1,3-pentanediol | 5% |
| 2-Pyrolidone | 2% |
| Ion-exchanged water | Balance |

EXAMPLE 13

A pigment dispersion 9 was prepared in the same manner as in Example 5 except that the following composition were used. Using the thus obtained pigment dispersion 9, an ink composition 13 was obtained.

| Pigment dispersion 9 | |
|---|---|
| C.I. Pigment Blue 56 (average particle size: 138 nm) | 15% |
| Formalin condensate of naphthalene sulfonate | 3% |
| Ion-exchanged water | Balance |
| Ink composition 13 | |
| Pigment dispersion 9 | 33.3% |
| Polyethylene glycol (molecular weight: 200) | 10% |
| Compound (1-9) | 0.05% |
| 2,2,4-Trimethyl-1,3-pentanediol | 4% |
| Triethylene glycol monobutyl ether | 2% |
| Ion-exchanged water | Balance |

EXAMPLE 14

An ink composition 14 was obtained in the same manner as in Example 1 except that the following compositions were used.

| Ink composition 14 | |
|---|---|
| Carboxyl group-bonded carbon black dispersion (solid content; 16.4% by weight, average particle size; 128 nm) | 33.3% |
| Diethylene glycol | 15% |
| Glycerin | 5% |
| Compound (1-4) | 0.8% |
| 2,2,4-Trimethyl-1,3-pentanediol | 2% |
| N-methyl-2-pyrolidone | 2% |
| Ion-exchanged water | Balance |

EXAMPLE 15

An ink composition 15 was obtained in the same manner as in Example 1 except that the following compositions were used.

| Ink composition 15 | |
|---|---|
| Carboxyl group-bonded carbon black dispersion (solid content 16.4% by weight, average particle size 128 nm) | 33.3% |
| Ethylene glycol | 15% |
| Compound (1-1) | 1% |
| 2,2,4-Trimethyl-1,3-pentanediol | 3% |
| N-methyl-2-pyrolidone | 2% |
| Ion-exchanged water | Balance |

EXAMPLE 16

An ink composition 16 was obtained in the same manner as in Example 1 except that the following compositions were used.

| Ink composition 16 | |
|---|---|
| Sulfonic group-bonded carbon black dispersion (solid content 18% by weight, average particle size 132 nm) | 33% |
| 1,5-Pentanediol | 5% |
| N-methyl-2-Pyrolidone | 2% |
| Compound (1-6) | 1% |
| 2,2,4-Trimethyl-1,3-pentanediol | 1% |
| Ion-exchanged water | Balance |

EXAMPLE 17

An ink composition 17 was obtained in the same manner as in Example 1 except that the following compositions were used.

| Ink composition 17 | |
|---|---|
| Sulfonic group-bonded carbon black dispersion (solid content 18% by weight, average particle size 132 nm) | 33% |
| 1,5-Pentanediol | 5% |
| N-methyl-2-pyrolidone | 2% |
| Compound (1-1) | 1% |
| 2,2,4-Trimethyl-1,3-pentanediol | 1.5% |
| Ion-exchanged water | Balance |

EXAMPLE 18

A pigment dispersion 10 was prepared in the same manner as in Example 5 except that the following composition were used. Using the thus obtained pigment dispersion 10, an ink composition 18 was obtained.

| Pigment dispersion 10 | |
|---|---|
| Carbon black (average particle size 53 nm) | 15% |
| Styrene-acrylate-diethanolamine methacrylate terpolymer | 3% |
| Ion-exchanged water | Balance |
| Ink composition 18 | |
| Pigment dispersion 10 | 33.3% |
| Polyethylene glycol (molecular weight: 200) | 5% |
| Ethylene glycol | 30% |
| Compound (1-5) | 0.01% |
| 2,2,4-Trimethyl-1,3-pentanediol | 8% |
| Ion-exchanged water | Balance |

EXAMPLE 19

A pigment dispersion 11 was prepared in the same manner as in Example 5 except that the following composition were used. Using the thus obtained pigment dispersion 11, an ink composition 19 was obtained.

| Pigment dispersion 11 | |
|---|---|
| Carbon black (average particle size 196 nm) | 15% |
| Styrene-acrylate-diethanolamine methacrylate terpolymer | 3% |
| Ion-exchanged water | Balance |
| Ink composition 19 | |
| Pigment dispersion 11 | 33.3% |
| 1,5-Pentanediol | 5% |
| N-methyl-2-pyrolidone | 6.5% |

-continued

| | |
|---|---|
| Compound (1-3) | 4% |
| 2,2,4-Trimethyl-1,3-pentanediol | 5% |
| Ion-exchanged water | Balance |

EXAMPLE 20

An ink composition 20 was prepared in the same manner as in Example 1 except that the following compositions were used and that the mixture was adjusted to pH 8 with sodium hydroxide.

| Ink composition 20 | |
|---|---|
| C.I. Direct Black 168 | 4% |
| Glycerin | 5% |
| Ethylene glycol | 5% |
| Compound (2-4) | 0.3% |
| 2,2,4-Trimethyl-1,3-pentanediol | 1% |
| Ion-exchanged water | Balance |

EXAMPLE 21

An ink composition 21 was prepared in the same manner as in Example 1 except that the following compositions were used and that the mixture was adjusted to pH 7.5 with sodium hydroxide.

| Ink composition 21 | |
|---|---|
| C.I. Direct Yellow 142 | 3.0% |
| Thiodiglycol | 8% |
| Compound (2-1) | 0.5% |
| 2,2,4-Trimethyl-1,3-pentanediol | 3% |
| Ion-exchanged water | Balance |

EXAMPLE 22

An ink composition 22 was prepared in the same manner as in Example 1 except that the following compositions were used and that the mixture was adjusted to pH 8 with 10% aqueous solution of lithium hydroxide.

| Ink composition 22 | |
|---|---|
| C.I. Direct Red 227 | 3% |
| Thiodiglycol | 8% |
| Compound (2-3) | 0.5% |
| 2,2,4-Trimethyl-1,3-pentanediol | 2% |
| Ion-exchanged water | Balance |

EXAMPLE 23

An ink composition 23 was prepared in the same manner as in Example 1 except that the following compositions were used and that the mixture was adjusted to pH 9 with 10% aqueous solution of lithium hydroxide.

| Ink composition 23 | |
|---|---|
| C.I. Direct Blue 199 | 3% |
| Thiodiglycol | 8% |
| Compound (2-3) | 0.5% |
| 2,2,4-Trimethyl-1,3-pentanediol | 3% |
| Ion-exchanged water | Balance |

EXAMPLE 24

A pigment dispersion 12 was prepared in the same manner as in Example 5 except that the following composition were used. Using the thus obtained pigment dispersion 12, an ink composition 24 was obtained.

| Pigment dispersion 12 | |
|---|---|
| Carbon black (average particle size: 104 nm) | 15% |
| Styrene-acrylate-diethanolamine methacrylate terpolymer | 3% |
| Ion-exchanged water | Balance |
| Ink composition 24 | |
| Pigment dispersion 12 | 33.3% |
| Diethylene glycol | 6.5% |
| Glycerin | 3.5% |
| Compound (2-1) | 0.3% |
| Compound (2-4) | 0.1% |
| 25% Aqueous solution of compound (13-3) | 0.5% |
| 2,2,4-Trimethyl-1,3-pentanediol | 2% |
| 2-Pyrolidone | 2% |
| Ion-exchanged water | Balance |

EXAMPLE 25

A pigment dispersion 13 was prepared in the same manner as in Example 5 except that the following composition were used. Using the thus obtained pigment dispersion 13, an ink composition 25 was obtained.

| Pigment dispersion 13 | |
|---|---|
| Carbon black (average particle size: 104 nm) | 15% |
| Styrene-acrylate-diethanolamine methacrylate terpolymer | 3% |
| Ion-exchanged water | Balance |
| Ink composition 25 | |
| Pigment dispersion 13 | 33.3% |
| Ethylene glycol | 6.5% |
| N-methyl-2-Pyrolidone | 3.5% |
| Compound (2-3) | 0.3% |
| 25% Aqueous solution of compound (13-4) | 0.5% |
| 2,2,4-Trimethyl-1,3-pentanediol | 3% |
| 2-Pyrolidone | 2% |
| Alkyl ester fluoride; nonionic surfactant | 0.3% |
| Ion-exchanged water | Balance |

EXAMPLE 26

A pigment dispersion 14 was prepared in the same manner as in Example 5 except that the following composition were used. Using the thus obtained pigment dispersion 14, an ink composition 26 was obtained.

| Pigment dispersion 14 | |
| --- | --- |
| Carbon black (average particle size: 99 nm) | 15% |
| Formalin condensate of naphthalene sulfonate | 3% |
| Ion-exchanged water | Balance |
| Ink composition 26 | |
| Pigment dispersion 14 | 33.3% |
| Polyethylene glycol (molecular weight: 200) | 15% |
| Compound (2-1) | 0.05% |
| 25% Aqueous solution of compound (13-2) | 0.1% |
| 2,2,4-Trimethyl-1,3-pentanediol | 5% |
| Alkyl ester fluoride; nonionic surfactant | 0.3% |
| Ion-exchanged water | Balance |

EXAMPLE 27

A pigment dispersion 15 was prepared in the same manner as in Example 5 except that the following compositions were used. Using the thus obtained pigment dispersion 15, an ink composition 27 was obtained.

| Pigment dispersion 15 | |
| --- | --- |
| C.I. Pigment Yellow 13 (average particle size: 117 nm) | 15% |
| Styrene-acrylate-diethanolamine methacrylate terpolymer | 3% |
| Ion-exchanged water | Balance |
| Ink composition 27 | |
| Pigment dispersion 15 | 33.3% |
| Glycerin | 5% |
| Diethylene glycol | 10% |
| Compound (2-5) | 0.3% |
| 25% Aqueous solution of compound (13-4) | 0.5% |
| 2,2,4-Trimethyl-1,3-pentanediol | 3% |
| 2-Pyrolidone | 2% |
| Ion-exchanged water | Balance |

EXAMPLE 28

A pigment dispersion 16 was prepared in the same manner as in Example 5 except that the following compositions were used. Using the thus obtained pigment dispersion 16, an ink composition 28 was obtained.

| Pigment dispersion 16 | |
| --- | --- |
| C.I. Pigment Yellow 74 (average particle size: 96 nm) | 15% |
| Formalin condensate of naphthalene sulfonate | 3% |
| Ion-exchanged water | Balance |
| Ink composition 28 | |
| Pigment dispersion 16 | 33.3% |
| Polyethylene glycol (molecular weight: 200) | 10% |
| Compound (2-4) | 0.05% |
| 2,2,4-Trimethyl-1,3-pentanediol | 5% |
| Ion-exchanged water | Balance |

EXAMPLE 29

A pigment dispersion 17 was prepared in the same manner as in Example 5 except that the following compositions were used. Using the thus obtained pigment dispersion 17, an ink composition 29 was obtained.

| Pigment dispersion 17 | |
| --- | --- |
| C.I. Pigment Red 122 (average particle size: 120 nm) | 15% |
| Styrene-acrylate-diethanolamine methacrylate terpolymer | 3% |
| Ion-exchanged water | Balance |
| Ink composition 29 | |
| Pigment dispersion 17 | 33.3% |
| Glycerin | 5% |
| Ethylene glycol | 10% |
| Compound (2-2) | 0.3% |
| 25% Aqueous solution of compound (13-4) | 0.5% |
| 2,2,4-Trimethyl-1,3-pentanediol | 2% |
| 2-Pyrolidone | 2% |
| Ion-exchanged water | Balance |

EXAMPLE 30

A pigment dispersion 18 was prepared in the same manner as in Example 5 except that the following composition were used. Using the thus obtained pigment dispersion 18, an ink composition 30 was obtained.

| Pigment dispersion 18 | |
| --- | --- |
| C.I. Pigment Red 57:1 (average particle size: 115 nm) | 15% |
| Formalin condensate of naphthalene sulfonate | 3% |
| Ion-exchanged water | Balance |
| Ink composition 30 | |
| Pigment dispersion 18 | 33.3% |
| Polyethylene glycol (molecular weight: 200) | 10% |
| Compound (2-5) | 0.3% |
| 2,2,4-Trimethyl-1,3-pentanediol | 1% |
| 2-Pyrolidone | 2% |
| Ion-exchanged water | Balance |

EXAMPLE 31

A pigment dispersion 19 was prepared in the same manner as in Example 5 except that the following composition were used. Using the thus obtained pigment dispersion 19, an ink composition 31 was obtained.

| Pigment dispersion 19 | |
| --- | --- |
| C.I. Pigment Blue 15:3 (average particle size: 123 nm) | 15% |
| Styrene-acrylate-diethanolamine methacrylate terpolymer | 3% |
| Ion-exchanged water | Balance |
| Ink composition 31 | |
| Pigment dispersion 19 | 33.3% |
| Glycerin | 3% |
| 1,5-Pentanediol | 15% |
| Compound (2-5) | 0.3% |
| 25% Aqueous solution of compound (13-4) | 0.5% |

-continued

| | |
|---|---|
| 2,2,4-Trimethyl-1,3-pentanediol | 5% |
| 2-Pyrolidone | 2% |
| Ion-exchanged water | Balance |

EXAMPLE 32

A pigment dispersion 20 was prepared in the same manner as in Example 5 except that the following composition were used. Using the thus obtained pigment dispersion 20, an ink composition 32 was obtained.

| Pigment dispersion 20 | |
|---|---|
| C.I. Pigment Blue 56 (average particle size: 138 nm) | 15% |
| Formalin condensate of naphthalene sulfonate | 3% |
| Ion-exchanged water | Balance |
| Ink composition 32 | |
| Pigment dispersion 20 | 33.3% |
| Polyethylene glycol (molecular weight: 200) | 10% |
| Compound (2-4) | 0.05% |
| 2,2,4-Trimethyl-1,3-pentanediol | 4% |
| Triethylene glycol monobutyl ether | 2% |
| Ion-exchanged water | Balance |

EXAMPLE 33

An ink composition 33 was prepared in the same manner as in Example 1 except that the following compositions were used.

| Ink composition 33 | |
|---|---|
| Carboxyl group-bonded carbon black dispersion (solid content 16.4% by weight, average particle size 128 nm) | 33.3% |
| Diethylene glycol | 15% |
| Glycerin | 5% |
| Compound (2-7) | 0.8% |
| 2,2,4-Trimethyl-1,3-pentanediol | 2% |
| N-methyl-2-pyrolidone | 2% |
| Ion-exchanged water | Balance |

EXAMPLE 34

An ink composition 34 was prepared in the same manner as in Example 1 except that the following compositions were used.

| Ink composition 34 | |
|---|---|
| Carboxyl group-bonded carbon black dispersion (solid content 16.4% by weight, average particle size 128 nm) | 33.3% |
| Ethylene glycol | 15% |
| Compound (2-1) | 1% |
| 2,2,4-Trimethyl-1,3-pentanediol | 3% |
| N-methyl-2-pyrolidone | 2% |
| Ion-exchanged water | Balance |

EXAMPLE 35

An ink composition 35 was prepared in the same manner as in Example 1 except that the following compositions were used.

| Ink composition 35 | |
|---|---|
| Sulfonic group-bonded carbon black dispersion (solid content 18% by weight, average particle size 132 nm) | 33% |
| 1,5-Pentanediol | 5% |
| N-methyl-2-pyrolidone | 2% |
| Compound (2-3) | 1% |
| 2,2,4-Trimethyl-1,3-pentanediol | 1% |
| Ion-exchanged water | Balance |

EXAMPLE 36

An ink composition 36 was prepared in the same manner as in Example 1 except that the following compositions were used.

| Ink composition 36 | |
|---|---|
| Sulfonic group-bonded carbon black dispersion (solid content 18% by weight, average particle size 132 nm) | 33% |
| 1,5-Pentanediol | 5% |
| N-methyl-2-pyrolidone | 2% |
| Compound (2-2) | 1% |
| 2,2,4-Trimethyl-1,3-pentanediol | 1.5% |
| Ion-exchanged water | Balance |

EXAMPLE 37

A pigment dispersion 21 was prepared in the same manner as in Example 5 except that the following compositions were used. Using the thus obtained pigment dispersion 21, an ink composition 37 was obtained.

| Ink composition 21 | |
|---|---|
| Carbon black (average particle size 53 nm) | 15% |
| Styrene-acrylate-diethanolamine methacrylate terpolymer | 3% |
| Ion-exchanged water | Balance |
| Ink composition 37 | |
| Pigment dispersion 21 | 33.3% |
| Polyethylene glycol (molecular weight: 200) | 5% |
| Ethylene glycol | 30% |
| Compound (2-5) | 0.01% |
| 2,2,4-Trimethyl-1,3-pentanediol | 8% |
| Ion-exchanged water | Balance |

COMPARATIVE EXAMPLE 1

An ink composition 38 was prepared in the same manner as in Example 5 except that ion-exchanged water was added instead of 2,2,4-trimethyl-1,3-pentanediol in the same amount.

COMPARATIVE EXAMPLE 2

An ink composition 39 was prepared in the same manner as in Example 25 except that ion-exchanged water was added instead of 2,2,4-trimethyl-1,3-pentanediol in the same amount.

COMPARATIVE EXAMPLE 3

An ink composition 40 was prepared in the same manner as in Example 5 except that, instead of 2,2,4-trimethyl-1,3-pentanediol, the compound (1-1) and ion-exchanged water were added such that the content of the compound (1-1) was 2% by weight in total.

COMPARATIVE EXAMPLE 4

An ink composition 41 was prepared in the same manner as in Example 6 except that diethylene glycol monobutyl ether was added instead of 2,2,4-trimethyl-1,3-pentanediol in the same amount.

COMPARATIVE EXAMPLE 5

An ink composition 42 was prepared in the same manner as in Example 10 except that diethylene glycol monobutyl ether was added instead of 2,2,4-trimethyl-1,3-pentanediol in the same amount.

COMPARATIVE EXAMPLE 6

An ink composition 43 was prepared in the same manner as in Example 24 except that 2-ethyl-2-methyl-1,3-propanediol was added instead of 2,2,4-trimethyl-1,3-pentanediol in the same amount.

COMPARATIVE EXAMPLE 7

An ink composition 44 was prepared in the same manner as in Example 12 except that 2-diethyl-1,3-propanediol was added instead of 2,2,4-trimethyl-1,3-pentanediol in the same amount.

COMPARATIVE EXAMPLE 8

An ink composition 45 was prepared in the same manner as in Example 33 except that 1,7-heptanediol was added instead of 2,2,4-trimethyl-1,3-pentanediol and the compound (2-5) in the same amount as a total amount thereof.

COMPARATIVE EXAMPLE 9

An ink composition 46 was prepared in the same manner as in Example 6 except that 1,8-octanediol was added instead of 2,2,4-trimethyl-1,3-pentanediol in the same amount.

COMPARATIVE EXAMPLE 10

An ink composition 47 was prepared in the same manner as in Example 14 except that 1,7-heptanediol was added instead of 2,2,4-trimethyl-1,3-pentanediol in the same amount.

COMPARATIVE EXAMPLE 11

An ink composition 48 was prepared in the same manner as in Example 4 except that 6% by weight of the following compound (15) was added instead of the compound (1-5).

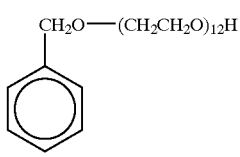

(15)

COMPARATIVE EXAMPLE 12

The following ink ingredients were mixed and stirred. The mixture was adjusted to pH 8 with 10% aqueous solution of lithium hydroxide and then filtered with a membrane filter having an average aperture size of 0.1 μm, thereby obtaining an ink composition 49.

| Ink composition 49 | |
|---|---|
| C.I. Acid Blue 234 | 2% |
| Polyethylene glycol #200 | 10% |
| Following Compound (16) | 6% |
| 2,2,4-trimethyl-1,3-pentanediol | 1% |
| Ion-exchanged water | Balance |

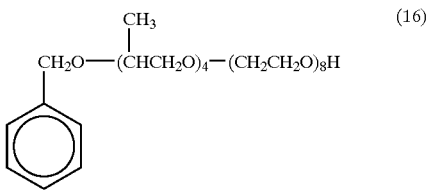

(16)

COMPARATIVE EXAMPLE 13

An ink composition 50 was prepared in the same manner as in Example 5 except that ion-exchanged water was added instead of the compound (1-1), the compound (1-3), and 25% aqueous solution of the compound (13-3) in the same amount as a total amount thereof.

COMPARATIVE EXAMPLE 14

An ink composition 51 was prepared in the same manner as in Example 5 except that 2,2,4-trimethyl-1,3-pentanediol was further added instead of the compound (1-1), the compound (1-3), and 25% aqueous solution of the compound (13-3) in the same amount as a total amount thereof.

COMPARATIVE EXAMPLE 15

An ink composition 52 was prepared in the same manner as in Example 15 except that 2,2,4-trimethyl-1,3-pentanediol was further added instead of the compound (1-1) in the same amount.

<Recording Apparatus>

The following tests were conducted on the inks described in Examples and Comparative Examples. The following three recording apparatuses were employed.

Recording Apparatus (A)

A piezoelectric ink jet printer having a plurality of nozzles, wherein each of the nozzles is capable of ejecting ink droplets each having a volume of 23 pl at a dot density of 600 dpi at the maximum on a plain paper.

Recording Apparatus (B)

A thermal ink jet printer having a plurality of nozzles, wherein each of the nozzles are capable of ejecting ink droplets each having a volume of 4 pl at a dot density of 1200 dpi at the maximum on a plain paper.

Recording Apparatus (C)

A piezoelectric ink jet printer having 48 nozzles arranged at a 360 dpi pitch, wherein each of the nozzles is capable of ejecting ink droplets having a volume of 4 pl, 7 pl or 11 pl depending upon an image to be printed at a dot density of 720 dpi at the maximum on a plain paper.

The recording apparatus used for printing and the results of the evaluations are summarized in Table 1 and Table 2.

<Evaluation Items>

1) Sharpness of Image

Printing was conducted on a recording medium, My Paper, manufactured by NBS Ricoh Company, Ltd. (sizing degree: 12 s, air-permeability; 16 s). After drying, the blur, color tone, and density of the image were observed with naked eyes and measured using a spectrodensitometer (manufactured by X-Rite Co., Ltd.). The evaluation was made in a comprehensive manner.

A: Excellent

B: Good

C: Fair

D: No good

2) Drying Property of Image

A solid image was printed on the recording medium. On printing, a filter paper was pressed on the recording medium with a pressure of 0.1 kg/cm² and the time until the ink became sufficiently dry not to transfer to the filter paper was measured.

A: Not longer that 3 seconds.

B: Longer than 3 seconds and shorter than 20 seconds.

C: 20 seconds or longer.

3) Strike-Through

A solid image having a density of 1.0 as measured with a spectrodensitometer (manufactured by X-Rite Co., Ltd.) was printed on the recording medium and the image was observed from the reverse side thereof with naked eyes.

A: The boundary between the solid image area and the unprinted area is completely vague so that the recording medium can be used for double-side printing without any problem.

B: The boundary between the solid image part and the unprinted area is nearly vague so that the recording medium can be used for double-side printing without any problem.

C: The colorant was not penetrated to the reverse side of the recording medium and the boundary between the solid image area and the unprinted area is a little vague so that the recording medium can be used for double-side printing without any problem.

D: The colorant was penetrated to the reverse side of the recording medium so that the recording medium was not able to be used for double-side printing.

4) Anti-Scratching Property

An image printed on the recording medium using each of the inks was rubbed with a finger, a cloth, an eraser and a marking pen 30 seconds after the printing. The state of the image after the rubbing was observed with naked eyes.

A: Changes were observed.

B: No change was observed.

5) Uniformity of Image

A solid image was printed on the recording medium and observed after drying.

A: The recording medium was uniformly colored with the ink as observed under magnification.

B: The recording medium was uniformly colored with the ink as observed with naked eyes.

C: The recording medium was colored with the ink so unevenly that the surface of the medium was seen in some places with naked eyes.

6) Preservability

An ink jet printer was left with an ink set therein at 60° C. for 7 days. Thereafter, a conventionally known cleaning operation of the ink jet printer was conducted until the printing function of the printer was restored to normal state.

A: Restored with one cleaning operation.

B: Restored with 2 to 5 cleaning operations.

C: Not restored with 5 cleaning operations.

<Recording Medium>

EXAMPLE 38 to EXAMPLE 57

Using the ink of Example 14, printing was performed on each of the following recording media. Then, evaluation was conducted.

EXAMPLE 38

Xerox Paper R, manufactured by Xerox Corp. (sizing degree: 8 s, air-permeability: 20 s)

EXAMPLE 39

REFEX, manufactured by Australian Paper Manufacturers Ltd. (Australia) (sizing degree: 25 s, air-permeability: 4 s)

EXAMPLE 40

NBS Copying and Printing Paper 90K, manufactured by NBS Ricoh Company, Ltd. (sizing degree: 60 s, air-permeability: 68 s)

EXAMPLE 41

PB Paper, manufactured by Canon Inc. (sizing degree: 21 s, air-permeability: 8 s)

EXAMPLE 42

NBS Copying and Printing Paper 45K, manufactured by NBS Ricoh Company, Ltd. (sizing degree: 11 s, air-permeability: 45 s)

EXAMPLE 43

Yamayuri, manufactured by Honshu Paper Co., Ltd. (sizing degree: 12 s, air-permeability: 21 s)

EXAMPLE 44

Togen PPC Paper Type S, manufactured by Ricoh Company, Ltd. (sizing degree: 22 s, air-permeability: 13 s)

EXAMPLE 45

Xerox Paper P, manufactured by Xerox Corp. (sizing degree: 24 s, air-permeability: 19 s)

EXAMPLE 46

Multiace, manufactured by Xerox Corp. (sizing degree: 25 s, air-permeability: 17 s)

EXAMPLE 47

Xerox 4024 Paper, manufactured by Xerox Corp. (sizing degree: 32 s, air-permeability: 21 s)

Using the ink of Example 24, printing was conducted on each of the following recording media. Then, evaluation was conducted.

EXAMPLE 48

Xerox Paper R, manufactured by Xerox Corp. (sizing degree: 8 s, air-permeability: 20 s)

EXAMPLE 49

REFEX, manufactured by Australian Paper Manufacturers Ltd. (Australia) (sizing degree: 25 s, air-permeability: 4 s)

EXAMPLE 50

NBS Copying and Printing Paper 90K, manufactured by NBS Ricoh Company Ltd. (sizing degree: 60 s, air-permeability: 68 s)

EXAMPLE 51

PB Paper, manufactured by Canon Inc. (sizing degree: 21 s, air-permeability: 8 s)

EXAMPLE 52

NBS Copying and Printing Paper 45K, manufactured by NBS Ricoh Company Ltd. (sizing degree: 11 s, air-permeability: 45 s)

EXAMPLE 53

Yamayuri, manufactured by Honshu Paper Co., Ltd. (sizing degree: 12 s, air-permeability: 21 s)

EXAMPLE 54

Togen PPC Paper Type S, manufactured by Ricoh Company Ltd. (sizing degree: 22 s, air-permeability: 13 s)

EXAMPLE 55

Paper P, manufactured by Xerox Corp. (sizing degree: 24 s, air-permeability: 19 s)

EXAMPLE 56

Multiace, manufactured by Xerox Corp. (sizing degree: 25 s, air-permeability: 17 s)

EXAMPLE 57

Xerox Paper 4024, manufactured by Xerox Corp. (sizing degree: 32 s, air-permeability: 21 s)

TABLE 1

| Example | Device | 1) | 2) | 3) | 4) | 5) | 6) |
|---|---|---|---|---|---|---|---|
| 1 | B | B | A | C | A | A | A |
| 2 | C | B | A | C | A | A | A |
| 3 | A | B | A | C | A | A | A |
| 4 | B | B | A | C | A | A | A |
| 5 | A | A | A | A | A | A | A |
| 6 | C | A | A | A | A | A | A |
| 7 | A | B | A | B | B | B | A |
| 8 | C | A | A | A | A | A | A |
| 9 | B | B | A | B | B | B | A |
| 10 | A | A | A | A | A | A | A |
| 11 | B | B | A | B | A | A | A |
| 12 | C | A | A | A | A | A | A |
| 13 | B | B | A | B | B | B | A |
| 14 | C | A | A | A | B | B | A |
| 15 | A | A | A | A | A | A | A |
| 16 | B | B | A | B | B | B | A |
| 17 | A | A | A | A | A | A | A |
| 18 | C | A | A | B | B | B | A |
| 19 | A | A | A | A | B | B | A |
| 20 | C | B | A | C | A | A | A |
| 21 | B | B | A | C | A | A | A |
| 22 | A | B | A | C | A | A | A |
| 23 | B | B | A | C | A | A | A |
| 24 | C | A | A | A | A | A | A |
| 25 | B | A | A | A | A | A | A |
| 26 | C | B | A | B | B | B | A |
| 27 | A | A | A | A | A | A | A |
| 28 | B | B | A | B | B | B | A |
| 29 | A | A | A | A | A | A | A |
| 30 | C | B | A | B | A | A | A |
| 31 | A | A | A | A | A | A | A |
| 32 | C | B | A | B | B | B | A |
| 33 | B | A | A | A | B | B | A |
| 34 | A | A | A | A | A | A | A |
| 35 | B | B | A | B | B | B | A |

TABLE 1-continued

| Example | Device | 1) | 2) | 3) | 4) | 5) | 6) |
|---|---|---|---|---|---|---|---|
| 36 | C | A | A | A | A | A | A |
| 37 | B | A | A | B | B | B | A |

1) Sharpness of image
2) Drying property of image
3) Strike-through
4) Anti-scratching property
5) Uniformity of image
6) Preservability

TABLE 2

| | Device | 1) | 2) | 3) | 4) | 5) | 6) |
|---|---|---|---|---|---|---|---|
| Comp. Ex. | | | | | | | |
| 1 | | D | C | A | D | D | A |
| 2 | | D | C | A | D | D | A |
| 3 | | B | B | D | B | C | C |
| 4 | | C | A | D | D | C | B |
| 5 | | C | B | C | D | C | B |
| 6 | | D | C | A | D | D | A |
| 7 | | D | C | A | D | D | A |
| 8 | | D | C | A | D | D | A |
| 9 | | D | C | A | D | D | A |
| 10 | | D | C | A | D | D | A |
| 11 | | D | C | A | D | D | A |
| 12 | | D | C | A | D | D | A |
| 13 | | B | C | A | D | D | A |
| 14 | | B | B | B | C | D | C |
| 15 | | B | B | B | C | D | B |
| Example | | | | | | | |
| 38 | C | B | A | B | B | B | — |
| 39 | C | B | A | B | B | B | — |
| 40 | C | B | A | A | B | B | — |
| 41 | C | B | A | A | B | A | — |
| 42 | C | B | A | A | B | A | — |
| 43 | C | B | A | A | B | B | — |
| 44 | C | B | A | A | B | A | — |
| 45 | C | B | A | A | B | B | — |
| 46 | C | B | A | A | B | A | — |
| 47 | C | B | A | A | B | A | — |
| 48 | C | B | A | B | B | B | — |
| 49 | C | B | A | B | B | B | — |
| 50 | C | B | A | A | B | B | — |
| 51 | C | B | A | A | B | A | — |
| 52 | C | B | A | A | B | A | — |
| 53 | C | B | A | A | B | B | — |
| 54 | C | B | A | A | B | A | — |
| 55 | C | B | A | A | B | B | — |
| 56 | C | B | A | A | B | A | — |
| 57 | C | B | A | A | B | A | — |

1) Sharpness of image
2) Drying property of image
3) Strike-through
4) Anti-scratching property
5) Uniformity of image
6) Preservability According to the present invention, there can be provided an aqueous recording liquid which exhibits high penetrability and high drying property irrespective of the type of a colorant and a paper and which allows production of an image of improved quality with little blur. Also, the recording liquid has neither phase separation, aggregation nor increase in viscosity and thus suitable for a recording method in which an image is formed on a recording medium by ejecting and jetting a recording liquid as droplets onto the recording medium from a minute ejection nozzle.

There can be also provided a recording liquid cartridge containing the aqueous recording liquid which has high penetrability, high reliability and high safety and which allows printing of image with excellent properties, and a recording apparatus including the cartridge.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2001-085890, filed Mar. 23, 2001, inclusive of the specification, claims and drawings, are hereby incorporated by reference herein.

What is claimed is:

1. An aqueous recording liquid comprising a colorant, 2,2,4-trimethyl-1,3-pentanediol, and at least one surfactant selected from the group consisting of a polyoxyethylene alkyl ether represented by formula (1):

$$R_1O(CH_2CH_2O)_pH \quad (1)$$

wherein $R_1$ represents a straight or branched alkyl group having 8 to 14 carbon atoms and p represents an integer of 1 to 30, and a polyoxyethylene alkyl ether acetate represented by formula (2):

$$R_2O(CH_2CH_2O)_qCH_2COOM \quad (2)$$

wherein $R_2$ represents a straight or branched alkyl group having 8 to 14 carbon atoms, q represents an integer of 3 to 8, and M represents an alkali metal ion, a quaternary ammonium, a quaternary phosphonium or an alkanolamine.

2. An aqueous recording liquid as claimed in claim 1, wherein said 2,2,4-trimethyl-1,3-pentanediol is present in an amount of not less than 0.1% by weight but not greater than 8% by weight.

3. An aqueous recording liquid as claimed in claim 1, wherein said surfactant is present in an amount of not less than 0.01% by weight but not greater than 4% by weight.

4. An aqueous recording liquid as claimed in claim 1, wherein said 2,2,4-trimethyl-1,3-pentanediol is present in an amount of not less than 0.1% by weight but not greater than 8% by weight and said surfactant is present in an amount of not less than 0.01% by weight but not greater than 4% by weight.

5. An aqueous recording liquid as claimed in claim 1, further comprising at least one water-soluble organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrolidone, N-methyl-2-pyrolidone, N-hydroxyethyl-2-pyrolidone and 1,3-dimethyl-2-imidazolidinone.

6. An aqueous recording liquid as claimed in claim 1, wherein said colorant is a pigment.

7. An aqueous recording liquid as claimed in claim 6, wherein said pigment has an average particle size in the range of 10 to 200 nm.

8. An aqueous recording liquid as claimed in claim 6, further comprising a dispersant having a carboxyl group, so that dispersion of said pigment in water is stabilized.

9. An aqueous recording liquid as claimed in claim 6, wherein said pigment is modified to have a hydrophilic group, so that dispersion of said pigment in water is stabilized.

10. An aqueous recording liquid as claimed in claim 9, wherein said hydrophilic group bonded to said pigment is a carboxyl group.

11. A recording method for forming an image on a recording medium, comprising ejecting an aqueous recording liquid according to claim 1 as droplets onto said recording medium from a minute ejection nozzle.

12. A recording method as claimed in claims 11, wherein said aqueous recording liquid ejected by being applied with thermal energy.

13. A recording method as claimed in claim 11, wherein said recording medium is formed of pulp fibers and has a sizing degree of at least 10 seconds and an air-permeability of 5 to 50 seconds.

14. A recording method as claimed in claim 11, wherein each of said droplets of the aqueous recording liquid ejected from said ejection nozzle has an ejection volume V (in pl) satisfying the following equation:

$$2.5 \times 10^8 / R^{2.6} \leq V \leq 6.0 \times 10^8 / R^{2.6}$$

wherein R represents the maximum recording density (in dpi) at which said droplets are ejected on said recording medium formed of pulp fibers and having a sizing degree of at least 10 seconds and an air-permeability of 5 to 50 seconds.

15. A recording method as claimed in claim 11, wherein a plurality droplets of said aqueous recording liquid are successively ejected from one ejection nozzle or separate ejection nozzles to form an image on the recording medium such that at least a part of pixels of the droplets are overlapped, and wherein two of aqueous recording liquid droplets which form the partially overlapped pixels are ejected with a time difference of not greater than 0.125 ms.

16. A recording liquid cartridge having a recording liquid container containing an aqueous recording liquid according to claim 1.

17. A recording liquid cartridge as claimed in claim 16, further comprising a recording head for ejecting droplets of an aqueous recording liquid according to claim 1.

18. An ink jet recording device comprising a recording liquid cartridge according to claim 17.

19. The aqueous recording liquid as claimed in claim 1, wherein the surfactant is a polyoxyethylene alkyl ether.

20. The aqueous recording liquid as claimed in claim 1, wherein the surfactant is a polyoxyethylene alkyl ether acetate.

21. The aqueous recording liquid as claimed in claim 1, further comprising 2-pyrrolidone.

22. The aqueous recording liquid as claimed in claim 21, wherein the 2-pyrrolidone is present in an amount of from 0.5 to 4% by weight.

23. The aqueous recording liquid as claimed in claim 1, comprising a polyoxyethylene alkyl ether wherein $R_1$ represents a straight alkyl group.

24. The aqueous recording liquid as claimed in claim 1, wherein the surfactant is a mixture of at least two different polyoxyethylene alkyl ethers of formula (1).

* * * * *